(12) United States Patent
Park

(10) Patent No.: US 11,438,209 B2
(45) Date of Patent: *Sep. 6, 2022

(54) METHOD AND APPARATUS FOR WIDEBAND OPERATION IN NR COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/218,913

(22) Filed: Mar. 31, 2021

(65) Prior Publication Data

US 2021/0218613 A1 Jul. 15, 2021

Related U.S. Application Data

(63) Continuation of application No. 16/009,615, filed on Jun. 15, 2018, now Pat. No. 10,999,118.

(30) Foreign Application Priority Data

Jun. 15, 2017 (KR) .................. 10-2017-0075778
Nov. 17, 2017 (KR) .................. 10-2017-0153742

(51) Int. Cl.
*H04L 27/26* (2006.01)
*H04L 5/00* (2006.01)
(Continued)

(52) U.S. Cl.
CPC ........ *H04L 27/2657* (2013.01); *H04L 5/0044* (2013.01); *H04L 5/0048* (2013.01);
(Continued)

(58) Field of Classification Search
CPC . H04L 27/2657; H04L 5/0044; H04L 5/0048; H04L 5/0053; H04L 27/2613;
(Continued)

(56) References Cited

U.S. PATENT DOCUMENTS 10,999,118 B2 * 5/2021 Park .................. H04J 11/0076
11,109,332 B2 * 8/2021 Xue .................... H04L 27/261
(Continued)

FOREIGN PATENT DOCUMENTS

| EP | 3595199 | 1/2020 |
|---|---|---|
| WO | 2017039373 A1 | 3/2017 |
| WO | 2018084623 | 5/2018 |

OTHER PUBLICATIONS

International Search Report (PCT/KR2018/006782).
(Continued)

*Primary Examiner* — Harry H Kim

(57) ABSTRACT

A wireless user device comprises an antenna; a transceiver; a processor; and memory storing instructions that, when executed by the processor, cause the wireless user device to: select, among a plurality of synchronization signal (SS) blocks, a first SS block comprising a first synchronization signal and comprising a first physical broadcast channel (PBCH); determine, from the first PBCH of the selected first SS block, a value of a first subcarrier offset between the first SS block and an RB grid; determine, based on the value of the first subcarrier offset and a frequency location of the first SS block, a frequency location of the RB grid; and decode, based on the determined frequency location of the RB grid, one or more of: a reference signal, a control channel, or a data channel.

22 Claims, 12 Drawing Sheets

(51) Int. Cl.
*H04W 56/00* (2009.01)
*H04W 72/04* (2009.01)
*H04J 11/00* (2006.01)
*H04B 7/06* (2006.01)
*H04B 7/0413* (2017.01)
*H04W 48/10* (2009.01)

(52) U.S. Cl.
CPC ........ *H04L 5/0053* (2013.01); *H04L 27/2613* (2013.01); *H04L 27/2692* (2013.01); *H04W 56/0015* (2013.01); *H04W 56/0045* (2013.01); *H04W 72/0453* (2013.01)

(58) Field of Classification Search
CPC .......... H04L 27/2692; H04W 56/0015; H04W 56/0045; H04W 72/0453; H04W 56/00; H04J 11/0076; H04J 11/0073; H04J 11/0069; H04J 2211/005; H04B 7/0695; H04B 7/0413
See application file for complete search history.

(56) References Cited

U.S. PATENT DOCUMENTS

| | | | |
|---|---|---|---|
| 2015/0110034 A1 | 4/2015 | Yang et al. | |
| 2015/0341803 A1 | 11/2015 | Kim et al. | |
| 2017/0064685 A1 | 3/2017 | Rico Alvarino et al. | |
| 2018/0124744 A1* | 5/2018 | Xue | H04W 72/005 |
| 2018/0198659 A1* | 7/2018 | Ko | H04L 27/2613 |
| 2018/0309559 A1* | 10/2018 | Wang | H04J 11/0073 |
| 2019/0140880 A1* | 5/2019 | Li | H04L 27/26025 |
| 2019/0208479 A1* | 7/2019 | Kim | H04W 72/0446 |
| 2019/0223126 A1* | 7/2019 | Liu | H04W 56/00 |
| 2019/0229867 A1 | 7/2019 | Yi et al. | |
| 2020/0022131 A1* | 1/2020 | Li | H04W 72/048 |
| 2020/0059810 A1* | 2/2020 | Harada | H04W 24/10 |
| 2020/0145950 A1* | 5/2020 | Harada | H04W 72/04 |
| 2021/0099332 A1* | 4/2021 | Berggren | H04W 72/0453 |

OTHER PUBLICATIONS

Written Opinion of the International Searching Authority (PCT/KR2018/006782).

Notification of transmittal of the International Search Report and the Written Opinion of the International Searching Authority, Or the Declaration (PCT/KR2018/006782).

Influence of frequency offset on the reception of OFDM/GPSK signal using MBDD algorithm' by Dimitrijević Bojana, Stošović Slavimirb, Milošević Nenada ORCID, and Nikolić Zorica. Telfor Journal, vol. 3, No. 2, 2011.

Intel Corporation, "On RS for Time/Frequency Offset Tracking", 3GPP TSG-RAN WG1 #89 R1-1707370 Hangzhou, China, May 15-19, 2017.

European search report for EU Application No. 18817941.0 dated on Mar. 10, 2021.

NTT DOCOMO, Inc.: "Discussion and evaluation on NR-PBCH design", 3GPP TSG RAN WG1 Meeting #89 R1-1709192 Hangzhou, P.R. China May 15-19, 2017.

* cited by examiner

[Fig 1]
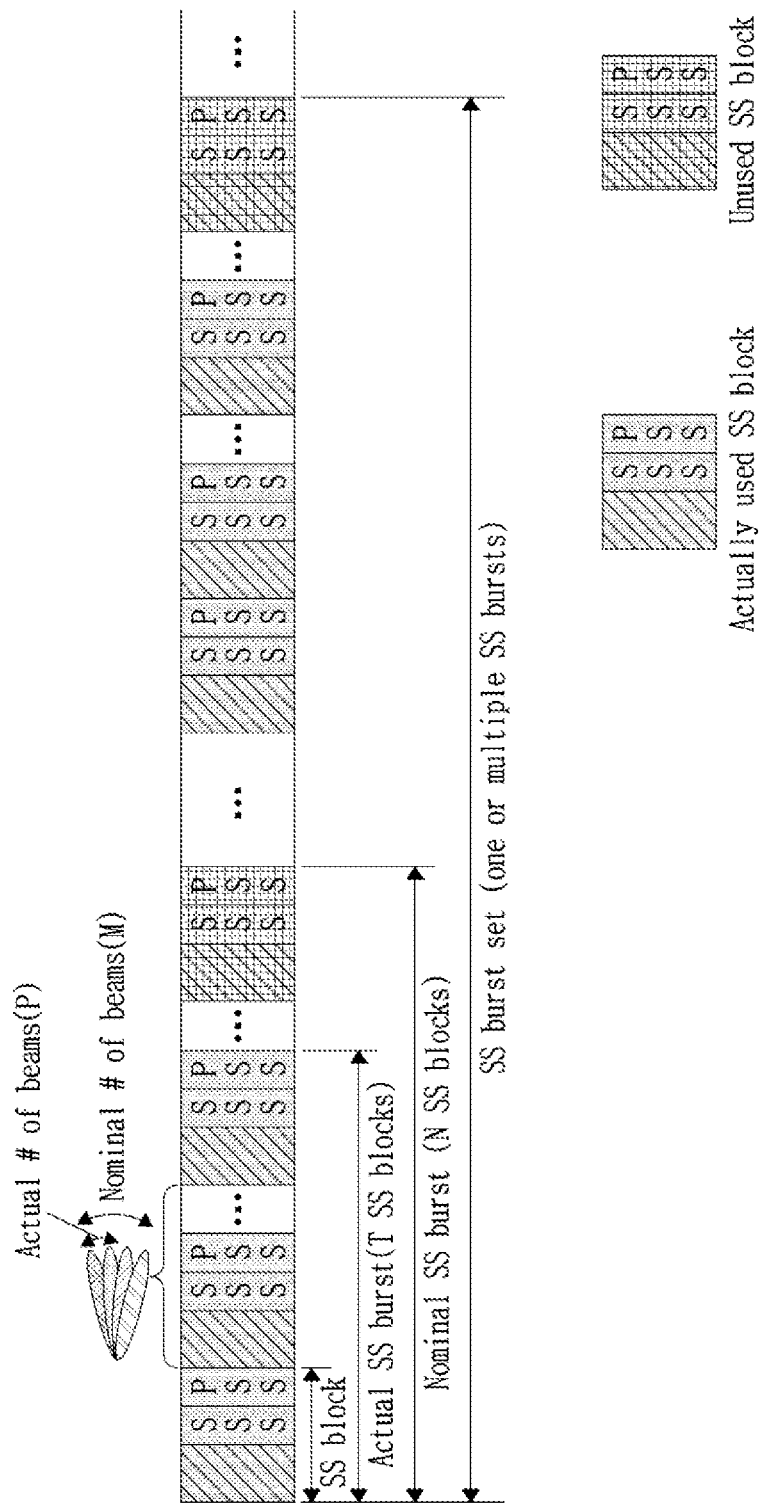

[Fig 2]
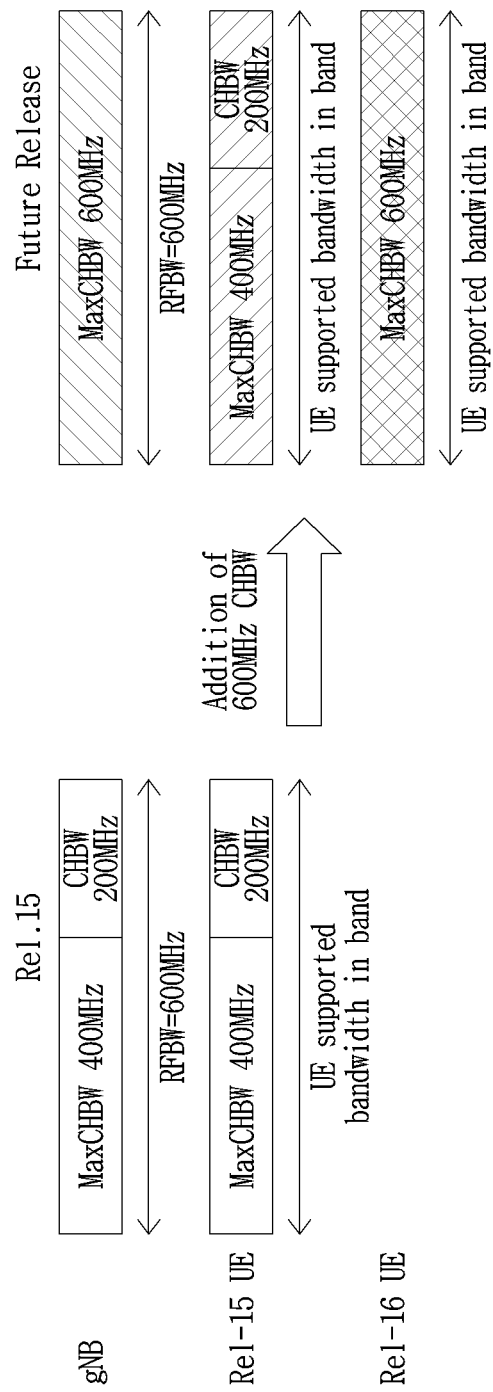

[Fig 3]
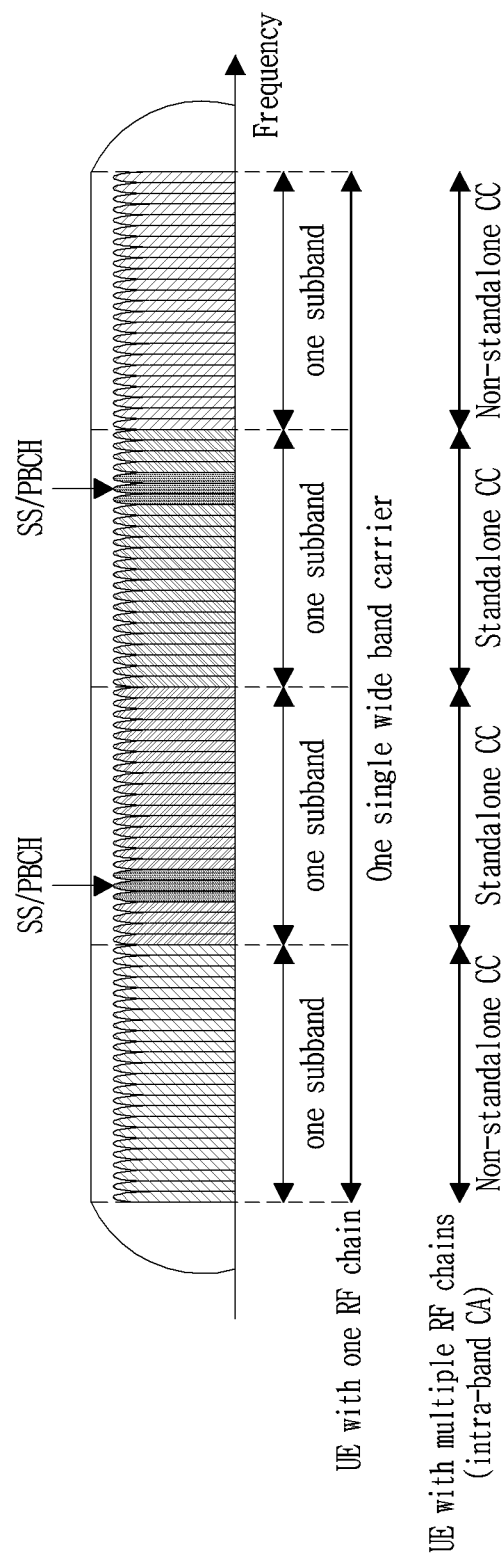

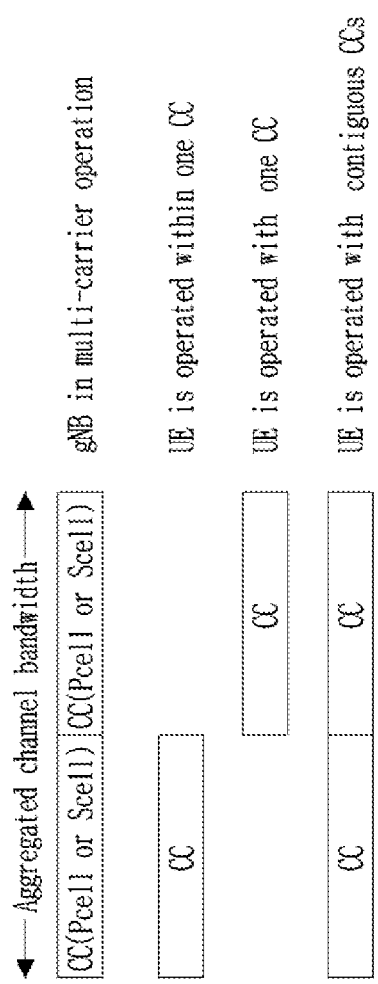
[Fig 4A]

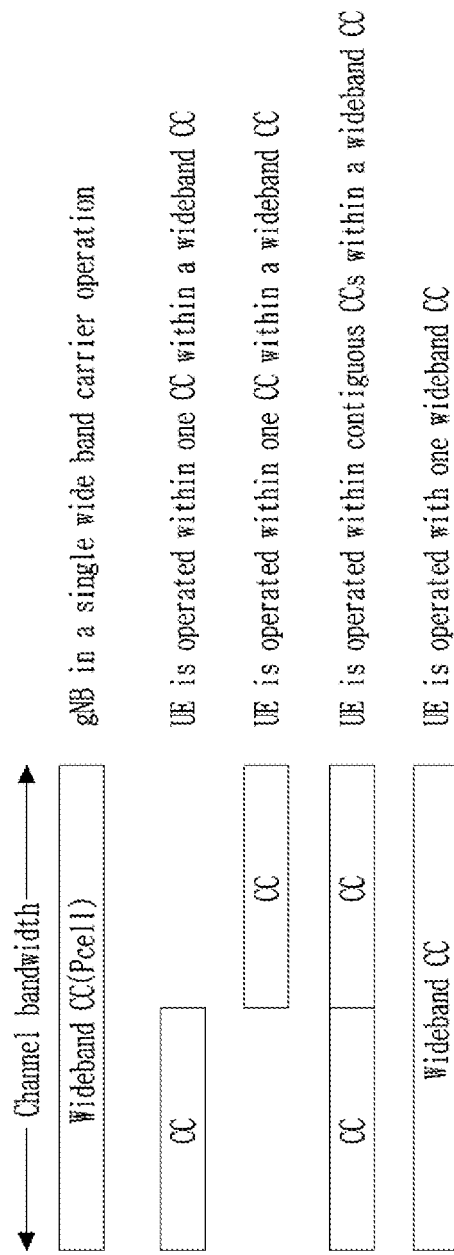
[Fig 4B]

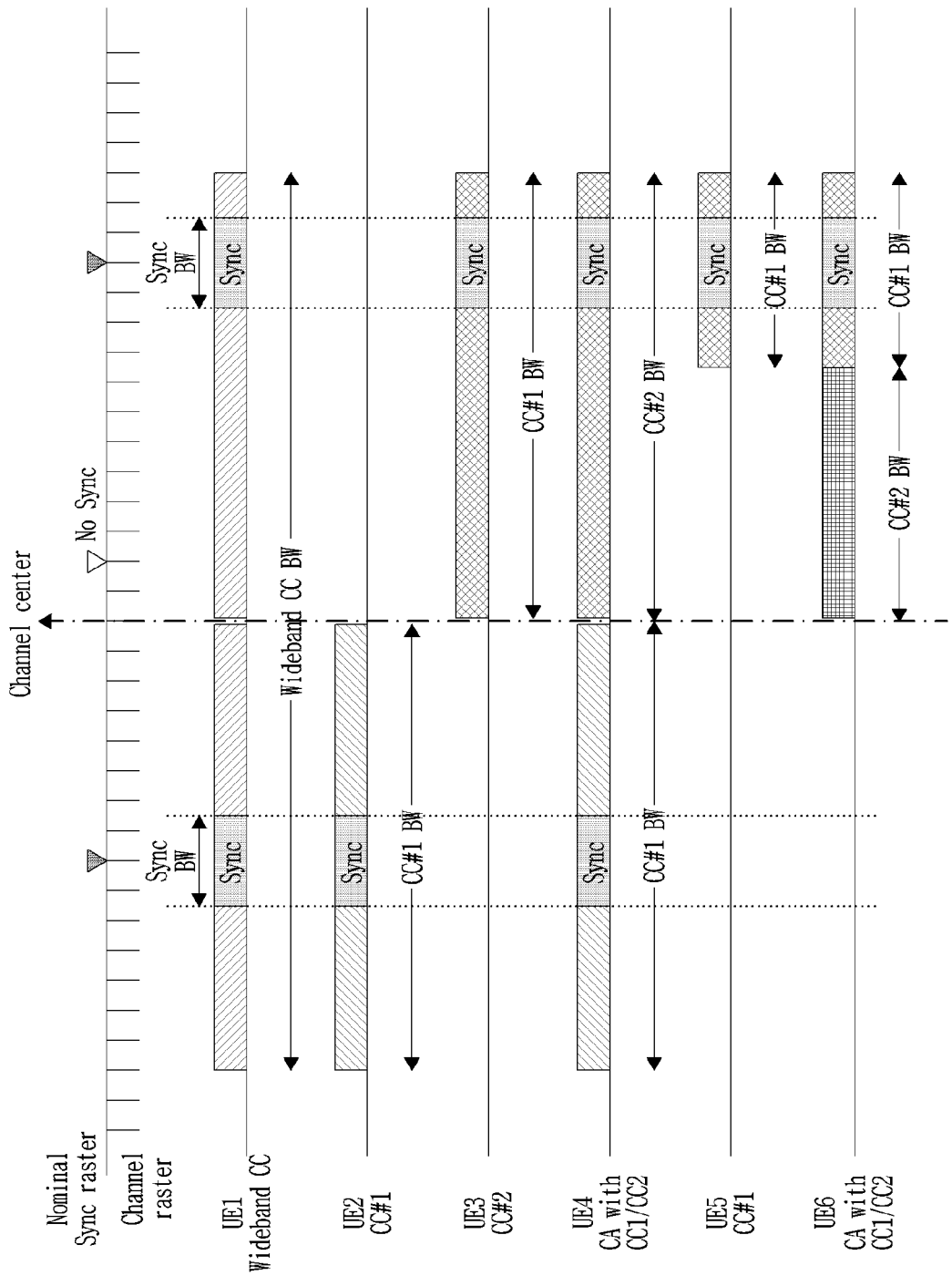
[Fig 5]

[Fig 6]
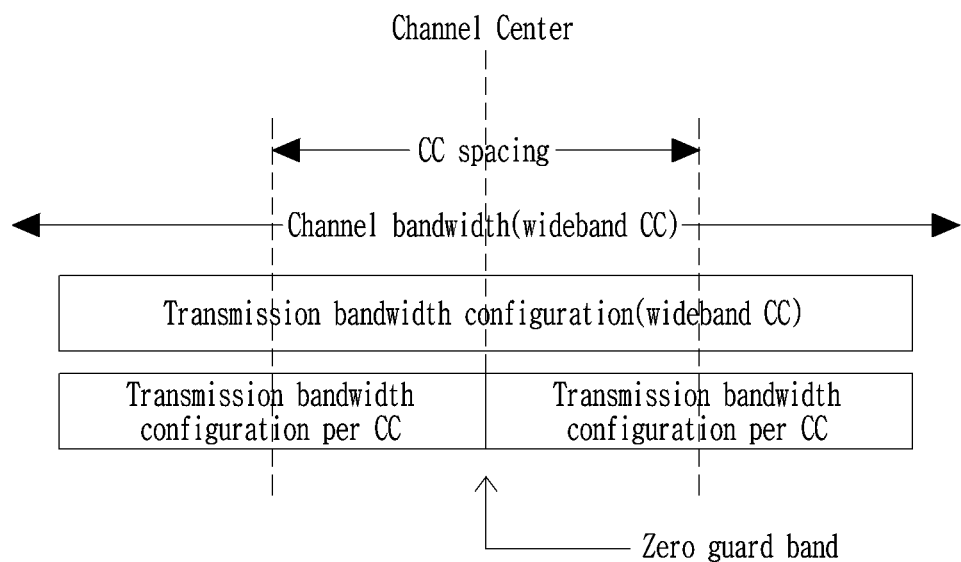
[Fig 7]
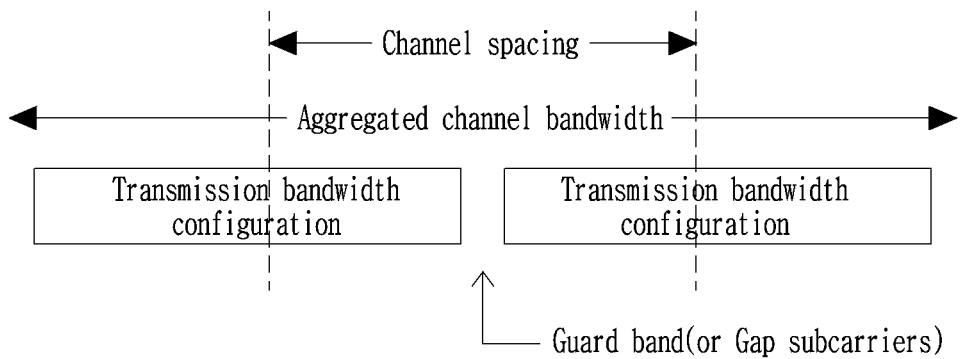

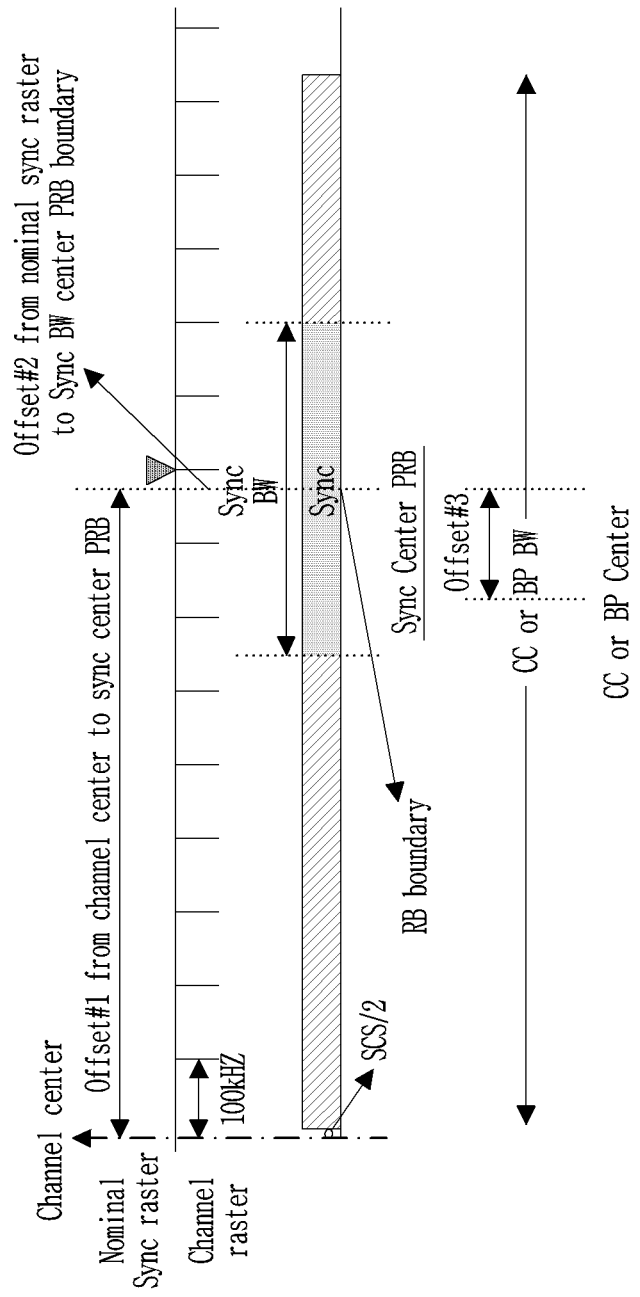
[Fig 8]

[Fig 9]
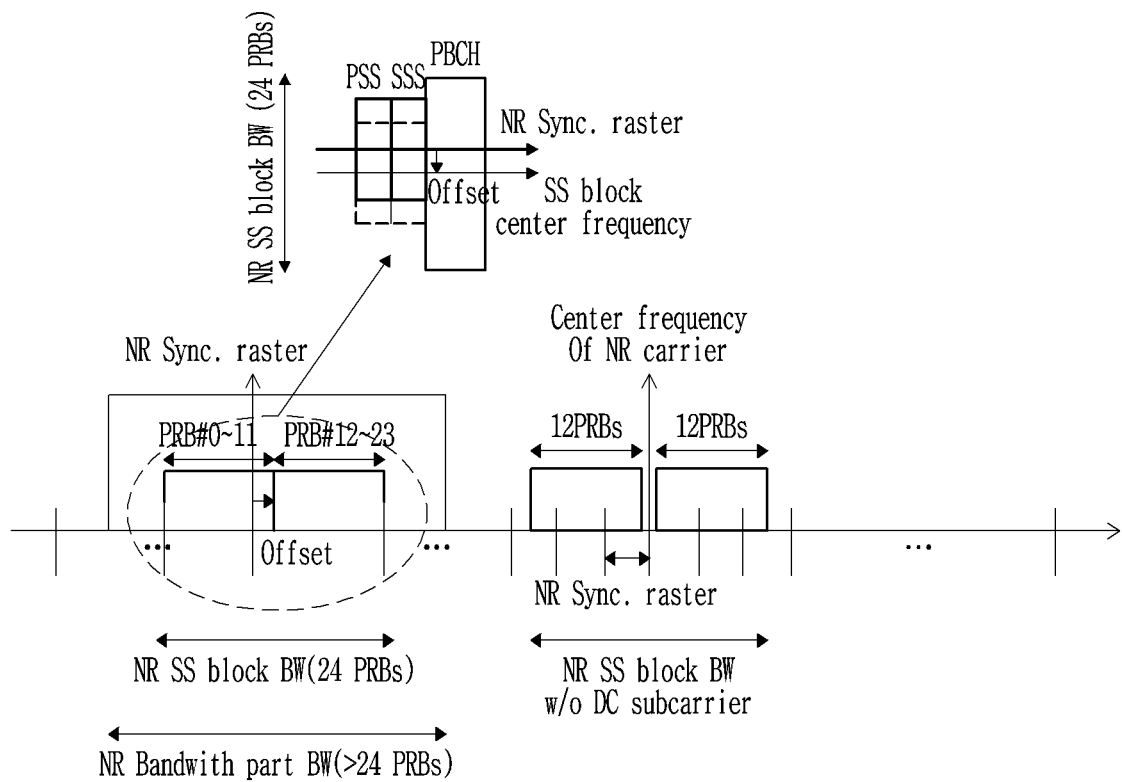

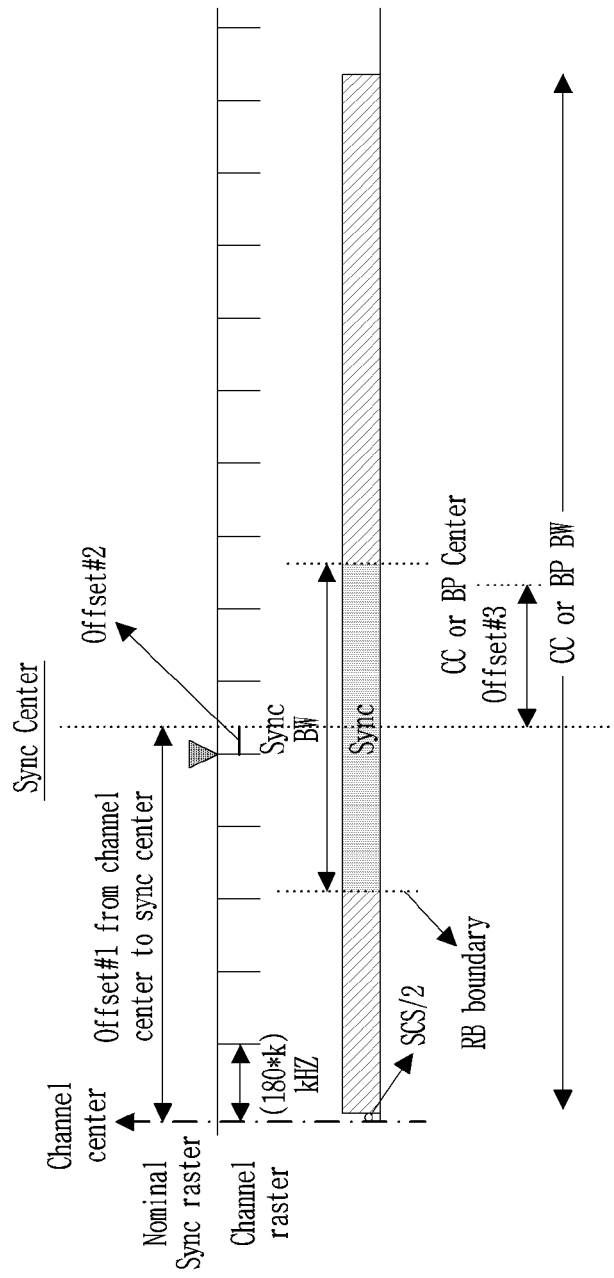

[Fig 11]
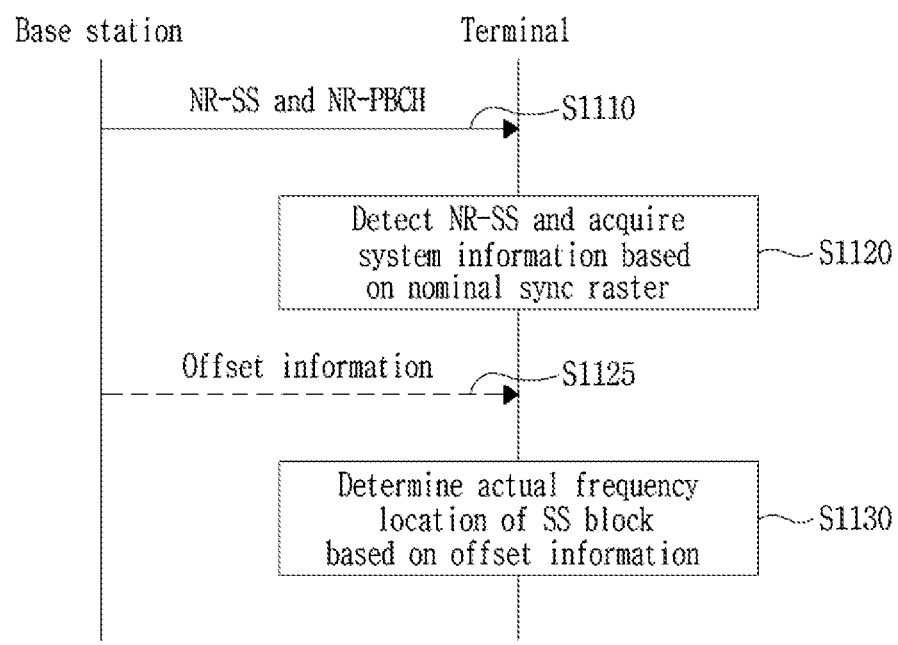

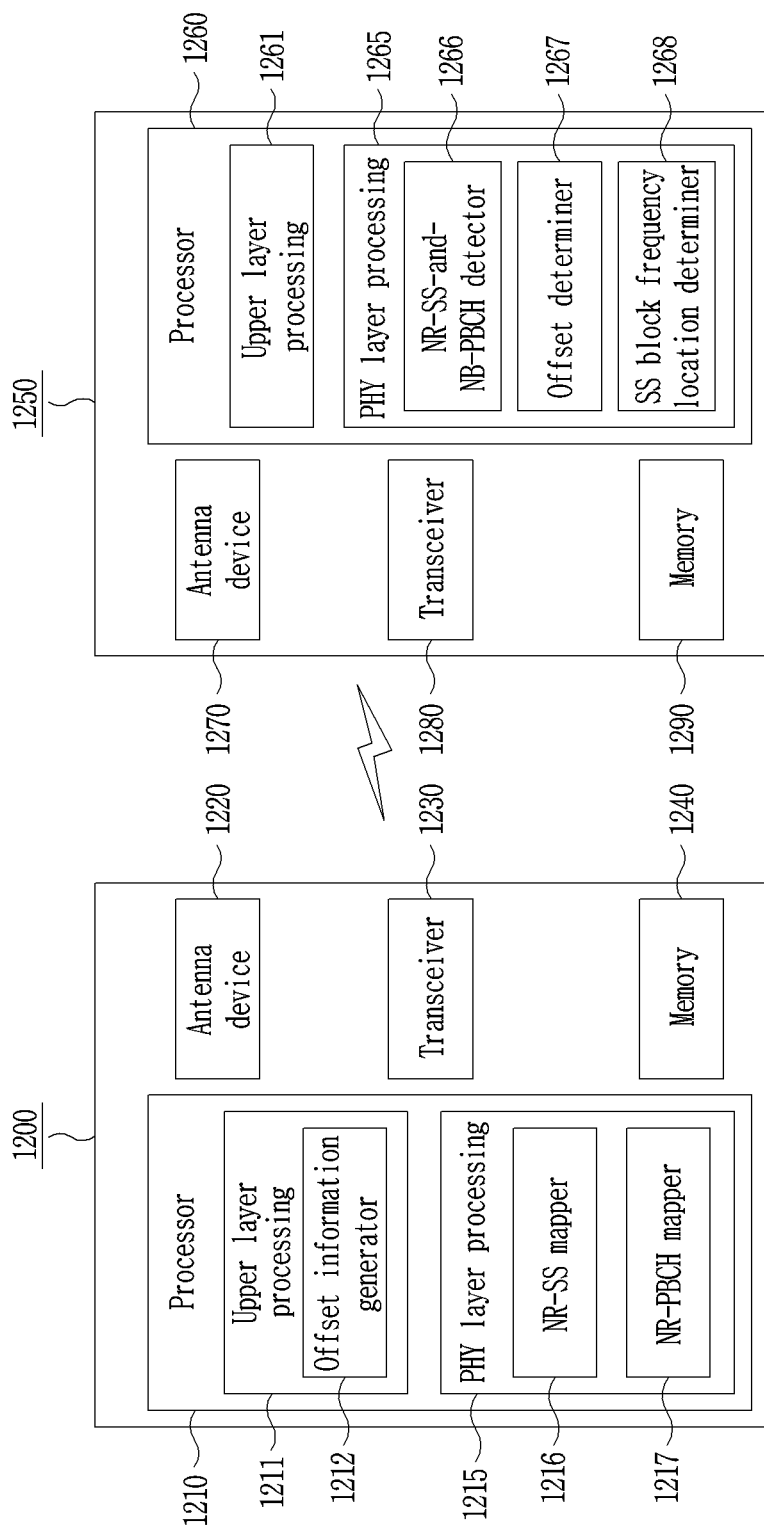

METHOD AND APPARATUS FOR WIDEBAND OPERATION IN NR COMMUNICATION SYSTEM

CROSS-REFERENCE TO RELATED APPLICATIONS

This application is a continuation of U.S. application Ser. No. 16/009,615, filed on Jun. 15, 2018, which claims priority from and the benefit of Korean Patent Application Nos. 10-2017-0075778, filed on Jun. 15, 2017, and 10-2017-0153742, filed on Nov. 17, 2017, each of which is hereby incorporated by reference in its entirety.

BACKGROUND

1. Field

The present disclosure relates to a radio communication system, and more particularly, to a method and apparatus for a wideband operation in a new radio (NR) communication system.

2. Discussion of the Background

The IMT (International Mobile Telecommunication) frameworks and standards have been developed by ITU (International Telecommunication Union) and, recently, the 5th generation (5G) communication has been discussed through a program called "IMT for 2020 and beyond".

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility, or the like. Also, there is a requirement for the NR system to support a wideband operation by providing a wider system bandwidth, which exceeds the maximum system bandwidth (e.g., up to 100 MHz) of legacy radio communication systems.

However, a method of supporting a wideband operation in the NR communication system, more particularly, a synchronization method for supporting the wideband operation is not defined in detail so far.

SUMMARY

One or more methods and apparatuses in an NR system will be described.

An example method of indicating an offset between an SS block and a physical resource block is disclosed. An example method may comprise receiving, by a user device, a synchronization signal (SS) block comprising a synchronization signal and a physical broadcast channel (PBCH), determining, from the PBCH, a value of a subcarrier offset between the SS block and an RB grid, determining, based on the value of the subcarrier offset and a frequency location of the SS block, the RB grid, and decoding, based on the determined RB grid, one or more of a reference signal, a control channel, or a data channel.

An example method of indicating one or more resource blocks (RBs) is disclosed. An example method may comprise generating, by a base station, a synchronization signal (SS) block comprising a synchronization signal and a physical broadcast channel (PBCH), wherein the PBCH comprises a value of a subcarrier offset between the SS block and an RB grid, transmitting, to a user device, the SS block, and mapping, to one or more resources associated with the RB grid, one or more of a reference signal, a control channel, or a data channel, wherein a frequency location of the one or more resources is based on the value of the subcarrier offset and a frequency location of the SS block.

BRIEF DESCRIPTION OF THE DRAWINGS

FIG. 1 illustrates configurations of a synchronization signal (SS) block, an SS burst, and an SS burst set according to the present disclosure;

FIG. 2 illustrates an example of supporting a new channel bandwidth for a wideband operation according to the present disclosure;

FIG. 3 and FIGS. 4A and 4B illustrate examples of a wideband operation according to the present disclosure;

FIG. 5 illustrates a new radio (NR) wideband operation based on a wideband component carrier (CC) in which a guard interval is absent and consecutive CCs according to the present disclosure;

FIG. 6 illustrates an example of setting a consecutive transmission bandwidth over CCs within a wideband CC bandwidth according to the present disclosure;

FIG. 7 illustrates an example of setting an inconsecutive transmission bandwidth over CCs within a wideband CC bandwidth according to the present disclosure;

FIG. 8 illustrates an example of indicating a frequency axial location of a sync raster corresponding to a resource block (RB) grid according to the present disclosure;

FIG. 9 illustrates an example of indicating an NR sync raster offset for RB alignment according to the present disclosure;

FIG. 10 illustrates an example of indicating a frequency axial location of a sync raster when a subcarrier spacing (SCS) or RB size-based channel raster is applied according to the present disclosure;

FIG. 11 is a flowchart illustrating an SS block frequency location signaling method according to the present disclosure; and FIG. 12 is a block diagram illustrating a configuration of a base station device and a terminal device according to the present disclosure.

DETAILED DESCRIPTION OF THE ILLUSTRATED EMBODIMENTS

Various examples will be described more fully hereinafter with reference to the accompanying drawings. Throughout the drawings and the detailed description, unless otherwise described, the same drawing reference numerals are understood to refer to the same elements, features, and structures. In describing the examples, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention. When an embodiment is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, a system to which various examples of the present disclosure are applied may be referred to as a New Radio (NR) system to be distinguished from other existing systems. The NR system may include one or more features defined by TS38 series of the third partnership project (3GPP) specification. However, the scope of the present disclosure is not limited thereto or restricted thereby. In addition, although the term 'NR system' is used herein as an example of a wireless communication system capable of supporting a variety of subcarrier spacings (SCSs), the term 'NR system' is not limited to the wireless communication system for supporting a plurality of subcarrier spacings.

Initially, a numerology used in the NR system is described.

An NR numerology may indicate a numerical value of a basic element or factor that generates a resource grid on a time-frequency domain for design of the NR system. As an example of a numerology of a 3rd Generation Partnership Project (3GPP) Long Term Evolution (LTE)/LTE-Advanced (LTE-A) system, a subcarrier spacing corresponds to 15 kilohertz (kHz) (or 7.5 kHz in the case of Multicast-Broadcast Single-Frequency Network (MBSFN)) and a normal Cyclic Prefix (CP) or an extended CP. Here, the meaning of the term 'numerology' does not restrictively indicate only the subcarrier spacing and includes a Cyclic Prefix (CP) length, a Transmit Time Interval (TTI) length, a number of Orthogonal Frequency Division Multiplexing (OFDM) symbols within a desired time interval, a duration of a single OFDM symbol, etc., associated with the subcarrier spacing (or determined based on the subcarrier spacing). That is, one numerology may be distinguished from another numerology based on at least one of the subcarrier spacing, the CP length, the TTI length, the number of OFDM symbols within the desired time interval, and the duration of the single OFDM symbol.

To meet the requirements of the program "International Mobile Telecommunication (IMT) for 2020 and beyond", the 3GPP NR system is currently considering a plurality of numerologies based on various scenarios, various service requirements, compatibility with a potential new system, and the like. In more detail, since current numerologies of wireless communication systems may not readily support, for example, a further higher frequency band, faster movement rate, and lower latency required in the program "IMT for 2020 and beyond", there is a need to define a new numerology.

For example, the NR system may support applications, such as enhanced Mobile Broadband (eMBB), massive Machine Type Communications/Ultra Machine Type Communications (mMTC/uMTC), and Ultra-Reliable and Low Latency Communications (URLLC). In particular, the requirements for user plane latency on the URLLC or eMBB service correspond to 0.5 ms in an upper link and 4 ms in all of the upper link and a down link. A significant latency decrease is required compared to the latency of 10 ms required in the 3GPP LTE and LTE-A system.

Various numerologies need to be supported to meet such various scenarios and various requirements in a single NR system. In particular, a plurality of subcarrier spacings (SCSs) needs to be supported, which differs from the existing LTE/LTE-A systems that supports a single SCS.

To resolve an issue that a wide bandwidth is unavailable in an existing carrier or frequency range of, e.g., 700 megahertz (MHz) or 2 gigahertz (GHz), a new numerology for the NR system, which includes supporting the plurality of SCSs, may be determined with the assumption of a wireless communication system that operates in a carrier or a frequency range of 6 GHz or more or 40 GHz or more. However, the scope of the present disclosure is not limited thereto.

To newly define the NR system, a terminal needs to define a synchronization procedure of, for example, acquiring basic minimum system information of a network and verifying a cell identifier (ID). However, a synchronization method for supporting a wideband operation in the NR system is not defined in detail.

Hereinafter, the synchronization method for supporting the wideband operation in the NR system will be described. In detail, a configuration of a synchronization signal (SS) signal and the wideband operation in the NR system will be described. Also, a method of signaling or determining a location of an SS block for a synchronization operation of supporting the wideband operation will be described.

FIG. 1 illustrates configurations of an SS block, an SS burst, and an SS burst set according to the present disclosure.

An NR-SS may include an NR-Primary SS (NR-PSS) and an NR-Secondary SS (NR-SSS) and, if supported, may further include an NR-Ternary SS (TSS). The NR-TSS may be applied to indicate an index of an SS block. FIG. 1 illustrates an NR-PSS/SSS/TSS transmission structure.

In FIG. 1, physical resource locations of NR-PSS/SSS/TSS transmitted per SS block do not indicate actual physical locations and indicate that NR-PSS/SSS and PBCH transmission may be performed within a single SS block. Multiplexing of other signals and channels, such as NR-PSS/SSS and NR-PBCH, allocated to actual physical resources may be applied using a variety of schemes.

Hereinafter, the SS block is described.

The NR-PSS/SSS are included in a single SS block and transmitted. That is, a terminal assumes that NR-PSS/SSS transmission is performed within the SS block. However, whether actual signals of the NR-PSS/SSS/PBCH may be transmitted in the SS block depends on decision of a base station. Depending on an NR-PBCH transmission periodicity and scheme, the NR-PSS/SSS/PBCH transmission may be present at all times within a single SS block or may be absent. Alternatively, in a specific SS block, the NR-PBCH transmission may be skipped and the NR-PSS/SSS transmission may be performed. Alternatively, if the NR-PBCH transmission is performed independently from the NR-SS transmission and the NR-SS and the NR-PBCH are not transmitted together at all times within the SS block, the NR-PBCH may be transmitted within a specific SS block or using fixed SS blocks.

Additionally, other signals may be transmitted in the SS block. For example, a Measurement Reference Signal (MRS) capable of being used by a Radio Resource Control (RRC) IDLE or RRC connected mode terminal for channel quality measurement for beamforming transmission and a TSS indicating a time domain index with an SS block index may be multiplexed and thereby transmitted within a single SS block with the NR-PSS/SSS/PBCH.

In a single SS block, the synchronization signal (NR-SS) and the broadcast channel (NR-PBCH) may be allocated to physical resources through Frequency Division Multiplexing (FDM), Time Division Multiplexing (TDM), or combination of FDM and TDM and may be transmitted from the base station to the terminal.

SS block transmission based on beam transmission or omni-directional beam transmission may be performed by applying a single beam or a plurality of different beams within the SS burst set periodicity. In particular, SS block transmission based on multi-beam transmission is required to compensate for channel attenuation occurring in a high frequency band (e.g., 6 GHz or more). However, in other frequency bands (e.g., less than 6 GHz), transmission may be performed once or iteratively in a single beamform or omni-directional beam transmission form, between all or a portion of the SS blocks. Here, the omni-directional beam transmission may be applied to a single SS block or a plurality of SS blocks to transmit signals and channels of, for example, the NR-SS/PBCH. Alternatively, the multi-beam transmission based on a narrow beam may be applied. Such determination purely depends on the implementation of the base station. Accordingly, an actual number of SS blocks/SS bursts to be used within the SS burst set periodicity may be independently determined and used per base station based on a beam width, frequency range, channel environment, target beam coverage of a transmission reception point (TRP) cell, and the like.

Hereinafter, the SS burst is described.

A single SS block or a plurality of SS blocks constitutes a single SS burst. If there is no need to define the SS burst within the SS burst set periodicity, the SS burst is simply regarded as allocation of consecutive SS blocks on physical resources. SS blocks that constitute a single SS burst may be consecutively or inconsecutively allocated in a time domain or a frequency domain. Also, an SS burst unit may not be required depending on an SS burst set design method. In this case, consecutive or inconsecutive SS blocks are defined within the SS burst set.

Hereinafter, the SS burst set is described.

A single SS burst set may be configured based on a single or a plurality of SS blocks, or a single or a plurality of SS bursts.

From perspective of a terminal, the terminal expects periodical NR-SS reception to which the same beam form is applied per SS burst set periodicity.

The terminal assumes a default SS burst transmission periodicity value per frequency range (e.g., subcarrier spacing) during an initial cell access per specific frequency band.

RRC connected, RRC IDLE, or RRC inactive terminal may receive updated SS burst set transmission periodicity information from the base station. The provided information may be used for subsequent channel measurement (e.g., RRM measurement).

Hereinafter, the resource allocation within an SS block according to the present disclosure is described.

Basically, an NR-PSS/SSS may be used to indicate time/frequency synchronization for initial cell access. Also, a cell ID and an NR-TSS may be used to indicate a time index (e.g., an SS block index) and may be multiplexed and thereby transmitted within a single SS block with the NR-PSS/SSS/PBCH.

For example, a single SS block includes three OFDM symbols and an SS bandwidth (BW), NR-TSS, NR-PSS, and NR-TSS are mapped to a first OFDM symbol using an FDM scheme, NR-SSS is mapped to a second OFDM symbol, and NR-PBCH is mapped to a third OFDM symbol. A temporal order of signals/channels mapped to OFDM symbols differ from the example.

Hereinafter, the NR-PBCH is described.

Information (i.e., contents) included in the NR-PBCH may also be referred to as an NR-Master Information Block (MIB). Partial information to be known by the terminal for initial access of the NR system in minimum system information (minimum SI) is configured as an MIB. The corresponding MIB is subsequently broadcasted to terminals through the NR-PBCH. Currently, the NR system considers multi-beam transmission and a plurality of numerologies. Thus, an MIB size greater than that defined in an LTE system is expected Information currently includable in the MIB for the NR system follows as:

At least a portion of a system frame number (SFN): A portion of the system frame number may be provided in the MIB and a remaining thereof may be obtained by the terminal through NR-PBCH blind detection. Alternatively, the whole system frame number may be provided through the MIB. For example, the NR system may explicitly indicate the system frame number or a hyper system frame number using 7, 10, or 17 bits within the MIB and remaining 3-bit information may be implicitly provided through a PBCH transmission method. In this manner, the terminal may obtain a final NR system frame number.

Cyclic Redundancy Check (CRC): A size of the CRC within an information field of the MIB may be defined as 16 bits or 24 bits. In the case of using the CRC of 24 bits, it is possible to further reduce a probability that the CRC triggers a false alarm. Accordingly, the NR-PBCH may be further reliably detected.

Physical Downlink Shared Channel (PDSCH) configuration information to receive Remaining Minimum System Information (RMSI): For example, the PDSCH configuration information refers to information about a Physical Downlink Control Channel (PDCCH) control search region (PDCCH configuration information) for scheduling a PDSCH used to transfer the RMSI. Here, information about the PDCCH control search region included in the MIB corresponds to PDCCH configuration information for corresponding PDCCH reception if the PDSCH used to transmit the RMSI is scheduled through the PDCCH.

SS block index: If SS block index information is not provided through another signal (e.g., NR-SSS, NR-TSS), the SS block index may be explicitly provided through the NR-PBCH.

Value tag: The value tag is information used to notify a change in contents of RMSI in advance through the MIB. Accordingly, it is possible to avoid unnecessary time latency and operation when the terminal obtains new system information (SI).

Scrambling of a DeModulation Reference Signal (DMRS) and data for a PDSCH: In the case of transmitting RMSI through a PDSCH based on a single frequency network scheme, a single frequency network operation may be supported by performing scrambling using a specific ID (e.g., a group cell ID) and scrambling information used herein may be provided through the MIB.

Configuration information for initial uplink transmission: This configuration information corresponds to configuration information for random access channel transmission.

Other additional information.

A bit size of the entire NR-MIB information that includes information disclosed in the aforementioned examples may have a value between about 40 bits and 100 bits.

Hereinafter, the wideband operation in the NR system will be described.

A channel raster refers to a basic unit used to define a center frequency of a channel. For example, if the channel raster is 100 kHz, the center frequency of the channel may correspond to an integer multiple of 100 kHz.

A raster (hereinafter, an NR-SS raster) for an NR-SS may be set to be different based on a frequency range. Also, in the frequency range that allows the wideband operation, the NR-SS raster may be greater than the channel raster or an SS raster (e.g., 100 kHz) in a Long Term Evolution (LTE)-based system to achieve the flexible deployment of the NR system. Also, not to affect an LTE channel band and a peripheral channel of the LTE channel band or channels for a non-$3^{rd}$ Generation Partnership Project (3GPP) service, the channel raster or the SS raster (e.g., 100 kHz) in the LTE-based system may be supported in the NR system. Accordingly, a center frequency for the NR-SS and a center frequency for an NR carrier may be equal to or differ from each other. If an NR-SS bandwidth is equal to a minimum carrier bandwidth in a specific frequency bandwidth, an NR-SS raster is equal to a corresponding carrier raster.

As described above, a relationship between a center frequency of an NR carrier and a center frequency of an SS may be defined based on flexibility and complexity of the terminal with the assumption that the center frequency of the SS may differ from the center frequency of the NR carrier with respect to an NR cell.

Also, in the NR system, a base station (e.g., gNB) may operate as a wideband component carrier (CC) with respect to some terminals and may also operate as a set of consecutive intra-band CCs to which a carrier aggregation is applied with respect to other terminals. Also, a case in which a size of a guard band between CCs within the wideband CC is zero may be allowed, and may be used to determine a channel raster. If the guard band is required, a number of subcarriers for the guard band between the CCs within the wideband CC may be minimized. Also, one or more SS locations may be allowed within the wideband CC, which may be considered to design a reference signal, a resource block group, a channel state information (CSI) subband, and the like.

Also, at least one bandwidth part (BP) may be configured in a single CC or a single wideband CC. A description of the BP may be provided from the base station to the terminal through an upper layer signaling, for example, a Radio Resource Control (RRC) signaling.

Here, a single BP may include a group of consecutive physical resource blocks (PRBs). A reserved resource may be included in the BP. Here, the reserved resource refers to a physical resource area that is unused by a system, that is, empty, however, reserved to be available for other services or purposes in the future, and may be defined as a portion of a BP band.

Also, a bandwidth of the BP may be set to be less than or equal to a maximum bandwidth (BW) capability supportable by the terminal. Although the BP may or may not include an SS block, the bandwidth of the BP may be set to be greater than a bandwidth of the SS block.

Parameters, such as a numerology (e.g., a CP length, an SCS, a number of OFDM symbols per slot (e.g., 7 or 14 OFDM symbols per slot), a center frequency, and a bandwidth (e.g., a number of PRBs)) may be used for a BP configuration. The BP may be configured for the terminal in an RRC connected state.

Each BP configuration may be associated with a single numerology configuration. For example, each of a plurality of BPs may support a different numerology and the plurality of BPs may support the same numerology.

Also, the terminal may expect that at least one downlink BP (DL BP) and a single uplink BP (UL BP) are active in a set of configured BPs during a specific period of time. Also, the terminal may be assumed to perform transmission and reception within the active DL/UL BP using an associated numerology. For example, a portion of or all of combinations of a PDSCH and/or a PDCCH and a Physical Uplink Control Channel (PUCCH) and/or a Physical Uplink Shared Channel (PUSCH) may be supported.

The plurality of BPs each supporting a different numerology may be configured in a single terminal. It does not indicate that the terminal needs to support different neologies at the same point in time.

It is not assumed that an active DL/UL BP is performed in a frequency range greater than a bandwidth (BW) capability supported by the terminal in a single CC.

FIG. 2 illustrates an example of supporting a new channel bandwidth for a wideband operation according to the present disclosure.

For example, when it is assumed that a transmission and reception bandwidth (radio frequency bandwidth (RFBW)) of a base station is 600 MHz and 400 MHz is supportable as a maximum channel bandwidth (CHBW) in 3GPP Release 15 (Rel 15), 600 MHz may be supported as the maximum CHBW in the future release. Here, a terminal may not operate in a bandwidth greater than a CHBW in which the base station operates.

As described above, a new maximum CHBW may be additionally defined while maintaining a backward compatibility. In this case, although a new system is introduced, legacy terminals need to operate in a new CHBW. Also, the base station may configure the new CHBW in which the legacy terminals may operate although the legacy terminals do not support the new CHBW. The base station may also support the new CHBW by applying a carrier aggregation (CA) based on CHBWs configured for the legacy terminals. All of the CHBWs supported by the terminal may be standardized and a portion of the CHBWs may be defined to be mandatory. A new CHBW less than a maximum CHBW defined in a specific frequency band may be additionally defined.

The terminal may be configured by the base station to operate in a CHBW not supported by the terminal, that is, greater than the CHBW supported by the terminal, by applying a CA to CHBWs less than the corresponding CHBW.

For example, the terminal not supporting 400 MHz may be configured by the base station to operate in a CHBW of 400 MHz by applying the CA to two CHBWs of 200 MHz or by applying the CA to four CHBWs of 100 MHz. Here, the CHBWs, such as 100 MHz and 200 MHz, refer to CHBWs that are defined in the corresponding frequency band. Also, the base station refers to a base station that supports an operation of the 400 MHz CHBW.

The terminal may inform the base station of the bandwidth capability and may also inform the base station of an operation scheme (e.g., the CA) capable of supporting the corresponding bandwidth.

A combination of CHBWs to which the CA is to be applied may be determined based on a complexity of the base station.

Any defined CHBW needs to be supportable based on at least one capability type of the terminal. The terminal may support a CHBW less than the maximum CHBW supportable by the corresponding terminal. Also, a set of CHBWs may be defined as a SCS specific parameter or a frequency band specific parameter.

The CHBW and the RFBW of the base station may be identical to or differ from each other. For example, the RFBW of the base station may be greater than a largest CHBW.

The maximum CHBW supported by the terminal may be defined as a DL/UL specific parameter and a SCS specific parameter.

For example, the maximum CHBW may be defined as 100 MHz in a frequency band of 6 GHz or less and may be defined as 400 MHz in a frequency band of 24 GHz or more. Also, different CHBWs may be defined with respect to different SCSs. Here, the maximum CHBW for an SCS may be defined to be less than the maximum CHBW defined for each frequency band. Although all the terminals do not need to support the maximum CHBW, the maximum CHBW defined for the corresponding terminal may be defined to be greater than or equal to the maximum CHBW defined for the base station.

Hereinafter, a method of configuring and indicating an NR-SS raster for the wideband operation in the NR system will be described.

Terminologies used in the following description are described as follows:

Wideband operation: describes an operation of supporting a bandwidth of maximum 400 MHz in the frequency band above 6 GHz and supporting a bandwidth of maximum 100 MHz in the frequency band of 6 GHz or less with respect to a single CC. A terminal that supports the wideband operation may be configured to operate as only a single CC with respect to a configured wide bandwidth, to operate by applying a CA to transmission bandwidths less than the configured wide bandwidth, or to operate in only a portion of the configured wide bandwidth. Here, the wide bandwidth may be configured based on, for example, a bandwidth capability of the base station, a radio frequency (RF) capability of the base station, a bandwidth capability of the terminal, an RF capability of the terminal, and a combination of bandwidths supported in the corresponding frequency band.

NR channel raster: describes a set of candidate locations at which a center frequency of a channel may be located based on a channel bandwidth supported in a specific frequency band. For example, candidate locations of the center frequency of the channel may be configured in a grid structure. A location on a frequency of the grid structure may be referred to as a channel raster. The channel raster in the NR system may be equal to or differ from a channel raster in an LTE-based system.

NR synchronization (sync) raster: describes a set of candidate locations at which an SS block (e.g., a unit including an NR-SS (e.g., at least one of an NR-PSS, an NR-SSS, and an TSS) and/or a broadcast channel (e.g., an NR-PBCH)) may be located. For example, candidate locations of the SS block may be configured in a grid structure. A location on a frequency of the grid structure may be referred to as the NR sync raster or an NR-SS raster. In a frequency band that supports a minimum bandwidth greater than an SS block bandwidth, the NR sync raster within a single CC may have a unit grid size greater than a unit grid size of the NR channel raster. That is, the NR sync raster may be located relatively less frequently compared to the NR channel raster within the CC. Unlike that the channel raster and the sync raster have the same location in the LTE-based system, the NR sync raster and the NR channel raster in the NR system may have the same location and may also have different locations. Also, the NR sync raster may be determined to meet the requirements for alignment between the SS block and an RB grid, that is, so that a start location of the SS block matches a start location of an RB.

Nominal sync raster: describes a potential NR sync raster assumed herein. The nominal sync raster may be defined as a subset of the NR channel raster. For example, the nominal sync raster may have the same value or location as an integer multiple of the NR channel raster. The nominal sync raster may be separate from an actual NR sync raster. This separation level may be represented using a frequency offset value.

Numerology (NM): describes a set of parameters used to define a single physical (PHY) layer transmission structure. For example, the parameters used to define the NM may include a CP length, an SCS, and a number of OFDM symbols per single slot. A resource area on a frequency-time axis for a transmission structure corresponding to at least one slot may be defined based on a value of each of the parameters used to define the NM.

FIG. 3 and FIGS. 4A and 4B illustrate examples of a wideband operation according to the present disclosure.

FIG. 3 illustrates an example of a wideband operation when an SS block is present or absent in a single subband, for example, a BP or a CC. FIGS. 4A and 4B illustrate examples of a wideband operation in an NR system compared to an LTE-based system.

A wide bandwidth allocated for a single CC in the NR system may include a single BP and may include a plurality of BPs. A number of BPs corresponding to the wide bandwidth for the single CC may be determined based on a bandwidth capability of a terminal. Referring to the examples of FIG. 3 and FIGS. 4A and 4B, various wideband operations may be supported based on the bandwidth capability of the terminal, a BP configuration of a base station, and a CC configuration of the base station.

In the example of FIG. 3, a terminal (UE) with a single RF chain may operate on a single wideband carrier (or a wideband CC) and a single wideband CC may be divided into four subbands or BPs. First and fourth subbands or BPs may not include an SS block, and second and third subbands or BPs may include SS blocks.

Also, in the example of FIG. 3, four CCs may be configured with respect to a terminal with a plurality of RF chains, that is, a UE with multiple RF channels, and an intra-band CA may be applied to the four CCs that include a non-standalone CC, a standalone CC, a standalone CC, and a non-standalone CC. Here, the CC may correspond to a transmission bandwidth less than the wideband CC. A subband or a BP including an SS block may be configured as a standalone CC so that the terminal may operate therein. A subband or a BP that does not include a SS block may be configured as a non-standalone CC. The terminal may operate with at least one standalone CC by applying a CA or a dual connectivity (DC).

FIG. 4A illustrates an example of a CA-based wideband operation in the LTE-based system. In detail, an aggregated channel bandwidth is configured by applying a CA to two CCs and the base station supports a multi-carrier operation. Here, a CC corresponding to a relatively low frequency location and a CC corresponding to a relatively high frequency location may be set as a primary cell (PCell) and a secondary cell (SCell), respectively, or may be set as an SCell and a PCell, respectively. The terminal may operate in a single CC corresponding to the relatively low frequency location, may operate in a single CC corresponding to the relatively high frequency location, or may operate in two consecutive CCs.

FIG. 4B illustrates an example of a BP-based wideband operation in the NR system. In detail, a wide bandwidth corresponds to a single CC, that is, a wideband CC, and may be set as a PCell. In this case, the base station may support a wideband carrier operation. The terminal may operate in a single CC (or a narrow transmission bandwidth or BP) corresponding to a relatively low frequency location within the wideband CC, may operate in a single CC (or the narrow transmission bandwidth or BP) corresponding to a relatively high frequency location within the wideband CC, may operate in two consecutive CCs within the wideband CC, or may operate within a single wideband CC.

Hereinafter, an NR channel raster will be further described.

A raster in an LTE-based or Evolved Universal Terrestrial Radio Access (E-UTRA) system is defined per 100 kHz within an E-UTRA frequency band without distinguishing a channel raster and a sync raster from each other. A raster in a Global System for Mobile Communications (GSM) and UTRA system is defined per 200 kHz. Additionally, an offset of 100 kHz may be applied in a portion of an UTRA band.

Considering that channels in the existing radio communication systems are supported even in the NR system, radio communication providers may not change a frequency offset value from an adjacent channel and an adjacent non-3 GPP service to maintain a unique channel center frequency. Also, there may be a need to maintain a channel raster defined as 100 kHz based on a regulation per country. Accordingly, a channel raster value of 100 kHz may be defined to be supported even in the NR system.

To support the channel raster of 100 kHz, alignment of a subcarrier grid or an RB grid may be employed. A channel spacing as shown in the following Table 2A and Table 2B may be used to align the channel raster of 100 kHz with the subcarrier grid or the RB grid. Table 2A represents a channel spacing for subcarrier grid alignment over the channel raster of 100 kHz and Table 2B represents a channel spacing for RB grid alignment over the channel raster of 100 kHz. In the NR system, one radio frame may correspond to 10 ms in a time axis, and one subframe may correspond to 1 ms in a time axis. Depending on a subcarrier spacing (SCS), one slot may correspond to 14 or 7 symbols in a time axis. Table 1 shows available quantities of slots and symbols in one radio frame. In table 1, SCSs of 480 KHz may not be applied.

TABLE 1

| SCS | The quantity of slots in 10 ms (14 symbols in 1 slot) | The quantity of slots in 10 ms (7 symbols in 1 slot) | The quantity of OFDM symbols in 10 ms |
|---|---|---|---|
| 15 Khz | 10 | 20 | 140 |
| 30 Khz | 20 | 40 | 280 |
| 60 Khz | 40 | 80 | 560 |
| 120 Khz | 80 | N/A | 1120 |
| 240 Khz | 160 | N/A | 2240 |
| 480 Khz | 320 | N/A | 4480 |

TABLE 2A

| Subcarrier spacing (kHz) | Channel spacing for subcarrier grid alignment (kHz) |
|---|---|
| 15 | N * 300 |
| 30 | N * 300 |
| 60 | N * 300 |
| 120 | N * 600 |
| 240 | N * 1200 |

TABLE 2B

| RB size (kHz) | Channel spacing for RB alignment (kHz) |
|---|---|
| 180 | N * 900 |
| 360 | N * 1800 |
| 720 | N * 3600 |
| 1440 | N * 7200 |
| 2880 | N * 14400 |

Referring to Table 2A, a channel spacing may be applied in a common multiple form of a subcarrier spacing value and a 100 kHz channel raster value for the subcarrier grid alignment.

Referring to Table 2B, a channel spacing may be applied in a common multiple form of an RB size and a 100 kHz channel raster value for the RB grid alignment.

In the above Table 2A and Table 2B, N denotes an integer. That is, through alignment with a subcarrier grid or an RB grid, channel spacings corresponding to a channel raster may be configured as frequency location candidates corresponding to an integer multiple, that is, N folds, of a predetermined size unit.

Here, if a value of an SCS to be used in the frequency band of 6 GHz or more in which an ultra-wideband frequency is present is 120 kHz or 240 kHz, a value of a channel spacing required for the subcarrier grid alignment or the RB grid alignment may significantly increase, which may lead to degrading the efficiency in using frequency resources. That is, in terms of efficiently and flexibly using frequency resources, the 100 kHz channel raster value may not be preferred in the frequency band to which the subcarrier spacing is applied. Accordingly, in the frequency band of 6 GHz or less, the existing UTRA/E-UTRA channel may be supported and the 100 kHz channel raster value may be used for coexistence with the non-3GPP service. In the frequency band of 6 GHz or more, the same channel raster value as an SCS (for example, Table 2A) or an RB size (for example, Table 2B) may be applied to efficiently perform the subcarrier grid alignment/RB grid alignment and to flexibly use frequency resources.

As described above, two channel raster values assumed herein may be defined as follows. The following channel raster values are provided as examples only and are not provided to limit the scope of the present disclosure.

In the frequency band of 6 GHz or less, a channel raster value of 100 kHz is used to maintain the channel raster of 100 kHz for reuse of a band of the LTE-based system or coexistence with the LTE-based system.

In the frequency band of 6 GHz or more, a channel raster value based on an SCS or an RB size is used. For example, an SCS of Table 2A corresponds to an RB size of Table 2B. For example, when a single RB is assumed to include 12 subcarriers, an SCS of 15 kHz of Table 2A corresponds to an RB size of 180 kHz of Table 2B, an SCS of 30 kHz of Table 2A corresponds to an RB size of 360 kHz of Table 2B, an SCS of 60 kHz of Table 2A corresponds to an RB size of 720 kHz of Table 2B, an SCS of 120 kHz of Table 2A corresponds to an RB size of 1440 kHz of Table 2B, and an SCS of 240 kHz of Table 2A corresponds to an RB size of 2880 kHz of Table 2B. As described above, the same channel raster value as an RB size applicable to a frequency band newly used for the NR system may be used. For example, one of the values of Table 2B may be selectively applied as a single NR channel raster value.

Hereinafter, a method of signaling or determining a location of an SS block for a synchronization operation of supporting a wideband operation in the NR system is described. In particular, the present disclosure includes examples of configuring and indicating an NR sync raster.

FIG. 5 illustrates an NR wideband operation based on a wideband CC in which a guard interval is absent and consecutive CCs according to the present disclosure.

In FIG. 5, it is assumed that, if an SS bandwidth, that is, a frequency bandwidth of an SS block is less than a minimum system bandwidth in a specific frequency band, an NR sync raster appears relatively less frequently on a frequency axis compared to an NR channel raster. That is, a sync raster of a single CC may be located on a frequency less frequently compared to the NR channel raster.

Such raster definition enables a center frequency of an NR carrier within a specific frequency band to be flexibly selected when configuring a single cell, that is, a single channel or carrier and, at the same time, enables cell search complexity and power consumption of the terminal to be minimized.

A location of a sync raster in which an actual SS block is to be transmitted may be determined to fit an NR system configuration scenario and an NR channel or frequency environment, based on a possible sync raster location, that is, a nominal sync raster. An example of a no sync in which an SS block transmission is not configured or not allocated in a nominal sync raster close to a channel center is illustrated in FIG. 5. Here, an SS block transmission is configured or allocated in other nominal sync raster within a wideband CC bandwidth (BW). An NR channel raster and a sync raster in which an SS block transmission is present may be allocated at the same frequency location.

In FIG. 5, it is assumed that a multiple relationship is present between the channel raster and the nominal sync raster. That is, a multiple value of the NR channel raster may correspond to a value of the nominal sync raster. For example, the channel raster may be present per frequency interval corresponding to a predetermined frequency size, for example, 100 kHz or an RB size, based on a DC carrier and the nominal sync raster may be present per frequency interval corresponding to an integer multiple, for example, 100 kHz*N or RB size*N, of the predetermined frequency size. Referring to FIG. 5, a frequency interval between two consecutive nominal sync raster frequency locations is 10 folds of that between two consecutive channel raster frequency locations. However, it is provided as an example and it is not limited to a specific multiple value.

Referring to FIG. 5, considering a maximum BW capability and a supportable operation mode of the terminal (e.g., whether a CA or a DC is supported), in the NR wideband operation, data transmission and reception may be performed in each different frequency bandwidth within a single wideband channel. For example, configurations of the wideband operation may be performed such as operation configurations of a first terminal to a sixth terminal, that is, UE1 to UE 6 of FIG. 5. For example, a bandwidth (BW) for data transmission and reception may be variously set based on a configuration of the base station within a maximum UE supported BW capability, such as, for example, if a wideband CC is a single carrier, if the CA is applied, or if the BP is configured.

In detail, UE1 may be configured to operate within a wideband CC that is a single carrier. UE1 may correspond to a terminal having a BW capability and an RF capability capable of performing data transmission and reception on a single wideband CC.

UE2 and UE3 may be configured to perform data transmission and reception only in a frequency domain corresponding to a portion of a wideband CC BW. For example, UE2 may be configured to operate in CC #1 BW and UE3 may be configured to operate in CC #2 BW.

UE4 may support the same BW capability same as that of UE1. However, the maximum bandwidth (BW) supported in a single RF channel is limited, that is, the maximum BW is less than the wideband CC BW. Accordingly, UE4 may be configured to perform a wideband operation by applying a CA using a plurality of RF chains. That is, UE4 may operate in a frequency bandwidth corresponding to the wideband CC BW by applying the CA to CC #1 and CC #2, that is, using a plurality of carriers.

UE5 may be configured to operate in a transmission bandwidth, that is, CC #1 BW, less than that of each of UE2, UE3, and UE4, and may perform data transmission and reception only in a corresponding frequency bandwidth.

An additional bandwidth may be allocated to UE6 in addition to a bandwidth set for UE5. For example, CC #2 BW may be additionally allocated to UE6 in addition to CC #1 BW. Here, since an SS block is absent in a band corresponding to CC #2 allocated to UE6, CC #2 corresponds to a non-standalone CC.

In the example of FIG. 5, each of CCs with various sizes, having a narrow bandwidth compared to the wideband CC, may correspond to a BP. Also, at least one BP may be included in a single CC.

Also, FIG. 5 illustrates an example in which an actual sync raster, that is, a center frequency of an SS block to be actually transmitted, is located in a portion of a nominal sync raster. However, if the sync raster is not aligned with a subcarrier grid or an RB grid in the wideband operation of the NR system, the system complexity may increase. For example, the terminal may need to experience many trials and errors to determine the subcarrier grid or the RB grid based on a frequency location at which an SS block is detected, and an additional procedure may be required to transmit and receive data smoothly between the base station and the terminal. Also, to avoid inter-subcarrier interference or inter-RB interference occurring due to different subcarrier grids or RB grids, avoidance design and an additional guard band may be required. Accordingly, accurate information may need to be provided to the terminal for alignment between the sync raster and the subcarrier grid or the RB grid in the NR system.

Here, the nominal sync raster indicates frequency locations at which an SS block center may be potentially located in a single frequency band and may be calculated based on a channel minimum BW, an SS block BW, and a channel raster according to Equation 1.

Nominal sync raster=channel min BW−SS block BW (i.e. NR-PBCH BW)+channel raster#  [Equation 1]

In detail, a PRB boundary of an SS BW or a center frequency of the SS BW within a frequency band including an NR sync raster needs to be aligned with a PRB or a PRB boundary within the system BW. Accordingly, an interval or an offset may be set between a location of the nominal sync raster and a location of a PRB boundary of an actual SS BW.

Whether to apply a guard band may be used to configure such NR sync raster. In the NR system band, a guard band or a guard subcarrier may be configured between CCs or BPs based on a bandwidth combination. Alternatively, consecutive subcarriers or consecutive PRBs may be configured between the CCs or the BPs without using the guard interval or the guard subcarrier. Hereinafter, whether to apply the guard band in the wideband operation is described with reference to FIGS. 6 and 7.

FIG. 6 illustrates an example of setting a consecutive transmission bandwidth over CCs within a wideband CC bandwidth according to the present disclosure.

Referring to FIG. 6, if a guard band is absent between consecutive transmission bandwidths, for example, between consecutive CCs or consecutive BPs, an unused subcarrier is absent between CCs. Accordingly, a subcarrier alignment or an RB alignment may be easily performed between a terminal operating in the wideband CC and a terminal operating in each CC.

FIG. 7 illustrates an example of setting an inconsecutive transmission bandwidth over CCs within a wideband CC bandwidth according to the present disclosure.

Referring to FIG. 7, if a guard band is present between consecutive transmission bandwidths, for example, between consecutive CCs or consecutive BPs, an unused subcarrier or a gap subcarrier is present between CCs. Accordingly, an unused subcarrier may need to be additionally used to determine or indicate a frequency axial location of an SS BW.

Embodiment 1

The present embodiment relates to a method of determining and signaling a sync raster or an SS block frequency location if a channel raster of 100 kHz in the frequency band of 6 GHz or less is applied.

FIG. 8 illustrates an example of indicating a frequency axial location of a sync raster to align an RB grid according to the present disclosure.

In the example of FIG. 8, it is assumed that a channel raster is 100 kHz and a nominal sync raster is an integer multiple of the channel raster or a value induced from Equation 1. Also, a PRB unit may start at a frequency location that is separate by SCS/2, which is a half of a subcarrier spacing (SCS) from a channel center frequency based on a DC carrier.

Referring to FIG. 8, if a boundary of a sync BW that is a transmission bandwidth of an SS block is configured to match an RB boundary, a location of a center frequency of the sync BW, that is, a location of a sync center may not match the nominal sync raster. Alternatively, due to mismatch between the nominal sync raster and the RB boundary, the boundary of the sync BW and the RB boundary may not match. Accordingly, a method of instructing a terminal to match a center frequency of an actual sync BW or a location of the sync raster to a center PRB boundary on the sync BW.

As a first example, a base station may inform the terminal of an offset value, that is, offset #1, from a channel center frequency (channel center) to a center frequency (sync raster) of a sync BW. Here, the offset may be indicated using various schemes, such as a distance (e.g., a unit of kHz) on a frequency axis, a number of subcarriers, and a number of PRBs.

Also, offset #1 may be defined as an offset value from the channel center frequency (channel center) to a PRB boundary of the sync BW. Here, the PRB boundary of the sync BW may correspond to a PRB boundary close to the channel center, for example, a PRB boundary toward a relatively low frequency in the example of FIG. 8, and may correspond to a PRB boundary away from the channel center, for example, a PRB boundary toward a relatively high frequency in the example of FIG. 8.

As a second example, the base station may inform the terminal of an offset value, that is, offset #2, from a frequency location of a nominal sync raster to a center frequency of a sync BW, that is, the sync raster. Here, the nominal sync raster that is a reference of offset #2 may correspond to a frequency location of a nominal sync raster closest to the sync BW. The offset may be indicated using various schemes, such as a distance (e.g., a unit of kHz) on a frequency axis, a quantity of subcarriers (e.g., a 4-bit value indicating one of 0 to 11 subcarriers), and a quantity of PRBs. The offset value may be defined based on a transmission numerology, that is, a subcarrier spacing, of a corresponding SS block.

Also, offset #2 may be defined as an offset value from the closest nominal sync raster to a PRB boundary on the sync BW. That is, offset #2 indicates an offset value up to a nominal sync raster closest to a center PRB boundary on the sync BW. Here, the PRB boundary on the sync BW may correspond to a PRB boundary close to the channel center, for example, a PRB boundary toward a relatively low frequency in the example of FIG. 8, and may correspond to a PRB boundary away from the channel center, for example, a PRB boundary toward a relatively high frequency in the example of FIG. 8.

As a third example, the base station may inform the terminal of an offset value, that is, offset #3, from a CC center frequency or a BP center frequency to a center frequency of a sync BW, that is, the sync raster. Here, the offset may be indicated using various schemes, such as a distance (e.g., a unit of kHz) on a frequency axis, a number of subcarriers, and a number of PRBs.

Also, offset #3 may be defined as an offset value from the CC center frequency or the BP center frequency to a PRB boundary of the sync BW. Here, the PRB boundary of the sync BW may correspond to a PRB boundary close to the channel center, for example, a PRB boundary toward a relatively low frequency in the example of FIG. 8, and may correspond to a PRB boundary away from the channel center, for example, a PRB boundary toward a relatively high frequency in the example of FIG. 8.

Also, if the base station provides information about the CC center frequency or the BP center frequency in a form of system information (SI), location information of an actual SS block within a CC or a BP in which an SS block is located, acquired by the terminal, may be included as additional information defined in the system information.

In examples of signaling offset #1, offset #2, and offset #3 described with reference to FIG. 8, a candidate location on the frequency axis of the sync raster may be determined based on a channel spacing value as shown among Table 1 and Table 2B. For example, the base station may determine in advance an RB index close to a specific nominal sync raster, for example, a location corresponding to an integer multiple of 900 kHz in the case of an SCS of 15 kHz, based on an SCS or an RB size. For example, the base station may maintain and manage an RB index corresponding to each nominal sync raster in a form of a mapping table. The base station may provide the terminal with a final RB index that is determined based on + or − offset value of a corresponding nominal sync raster. Accordingly, if the terminal receives signaling information associated with an RB index and a specific offset value, the terminal may acquire an PRB index in which an SS block is located based on a correlation therebetween. For example, the terminal may acquire a center PRB index to which the SS block is allocated or a boundary PRB index to which the SS block is allocated.

By signaling information associated with various offsets to the terminal, the base station may provide the terminal with information associated with a frequency location at which an actual SS block is located. The terminal may smoothly perform transmission and reception of data/control RS signal in a corresponding frequency band based on frequency location information of the SS block.

In the aforementioned examples, if an SS BW is equal to a minimum carrier BW in a specific frequency band in the NR system, the sync raster and the channel raster may match. If the sync raster is located at the channel center, a value of SCS/2 for a DC carrier may not be used to determine the sync raster. That is, if the sync raster and the channel center are present at the same location, SCS/2=0 may be assumed to determine the sync raster value based on the DC carrier. If the channel center and the sync raster have the same frequency location, the SS BW may be present on each of both sides of the channel center excluding the DC subcarrier.

It may be assumed that, if an SS BW is less than a minimum system BW in a specific frequency band, the sync raster appears relatively less frequently on a frequency axis compared to the channel raster. Through this, it is possible to reduce burden of an initial cell selection on a terminal side and to achieve a flexible NR system configuration. In this case, the NR sync raster may be determined based on SCS/2 by the DC carrier.

Hereinafter, an example in which the sync raster is not located at the channel center and located in a corresponding channel BW, that is, the channel center differs from a center of the SS BW, that is, the sync raster is described. Also, a frequency location of the sync raster is assumed as the center of the SS BW in which the SS block is allocated.

In FIG. 8, the nominal sync raster value is assumed as a value corresponding to an integer multiple of the channel raster, for example, 100 kHz. Since the nominal sync raster appears relatively less frequently compared to the channel raster, the terminal may acquire a cell ID and perform synchronization by attempting demodulation of NR-SS (i.e., NR-PSS/SSS) based on the sync raster during an initial cell search. Here, although the terminal succeeds in detecting an SS block, the terminal may be unaware of information associated with a frequency location of a corresponding SS BW. Accordingly, information associated with a center or a boundary of the SS BW needs to be additionally provided to the terminal.

Information associated with the frequency offset transmitted from the base station to the terminal in FIG. 8 may be used to verify information associated with the center or the boundary of the SS BW. Also, information associated with the frequency offset may be signaled with presumption that the boundary of the SS BW and a boundary of a PRB grid defined based on a specific numerology are aligned. Also, a PRB index within the PRB grid may be used based on the specific numerology assumed by the terminal and may be used for the base station to inform the terminal of location information of the sync raster based on the presumed PRB index. A PRB grid boundary may be defined based on the numerology of the NR system. For example, the PRB grid boundary may include 15 kHz SCS-based PRB grid boundary for frequency bands below, or equal to, 6 GHz and 60 kHz SCS-based PRB grid boundary for frequency bands above 6 Ghz.

Each SCS or RB size and a channel spacing value for RB alignment can be verified by referring to Table 1 or Table 2A/2B. Referring to Table 1 or Table 2A/2B, a location of a preferred NR sync raster may be defined based on an RB size associated with an SCS value. The offset value is used to determine a frequency domain of an NR SS block to be aligned in an RB closest to the nominal sync raster. Thus, it may reduce signaling overhead for indicating a transmittable NR SS BW of the corresponding NR SS block and an initial cell search complexity of the terminal.

As an example of information associated with the NR sync raster for the RB grid alignment, an offset, that is, offset #2 of FIG. 8, between the nominal sync raster and the sync raster, that is, the center frequency location of the SS BW, may be defined as expressed by Equation 2.

$$(SCS/2+Gap)+(RB\ size*t)=NR\ channel\ raster*N+offset \quad [\text{Equation 2}]$$

Equation 2 represents a center frequency location of the NR sync raster toward a relatively high frequency, that is, + direction based on the channel center. In Equation 2, it may be assumed that "SCS/2" has a value of a kHz unit, "RB size" has a value of a kHz unit, and "NR channel raster" is 100 kHz in the frequency band of 6 GHz or less.

In Equation 2, t and T may be determined as values that allow a value of "RB size*t" and a value of "NR channel raster*N" to be equal to a common multiple between the RB size and the NR channel raster. For example, if the RB size is 180 kHz and the NR channel raster is 100 kHz, a closest value to the channel center among common multiples therebetween may be 900 kHz. Accordingly, a value of t may be determined as 5 and a value of N may be determined as 9.

In Equation 2, if a guard band is present (see FIG. 7), "Gap" may have a value corresponding to a size of a gap subcarrier and greater than zero. If the guard band is absent (see FIG. 6), "Gap" may have a value of zero.

In the case of determining a value of SCS/2 according to Equation 2, the SCS may correspond to a value of the SCS assumed in a BP or a CC to which the DC carrier is allocated. Accordingly, the SCS of Equation 2 may differ from that assumed between a BP in which the SS block is transmitted and a CP in which the DC carrier is present.

FIG. 9 illustrates an example of indicating an NR sync raster offset for RB alignment according to the present disclosure.

In the example of FIG. 9, it may be assumed that an NR SS block with a size of 24 PRBs is transmitted in an NR BP with a bandwidth greater than 24 PRBs. Here, a center of an SS block, for example, a boundary between PRB #11 and PRB #12 may not match an actual NR sync raster and an interval therebetween may be defined as an offset, for example, offset #2.

If the NR SS block is located at a channel center, a bandwidth of the NR SS block (NR SS block BW) without a DC subcarrier may include a bandwidth corresponding to 12 PRBs toward a relatively low frequency and a bandwidth corresponding to 12 PRBs toward a relatively high frequency. In this case, the NR sync raster and the channel center frequency or the carrier center frequency may match and an offset value may be zero.

For example, the terminal may assume an SCS value for the DC carrier and the SS block as 15 kHz that is a default SCS value and may assume a channel raster value as 100 kHz, to detect the SS block. In this case, a nominal sync raster value is assumed as a common multiple between the channel raster value and the RB size. If the frequency band and the numerology are assumed, the sync raster for the RB alignment may be calculated according to Equation 3 as represented by the following Equation 3.

$$\text{sync raster}=(15 \text{ kHz}/2+\text{Gap})+(180 \text{ kHz}*t)=100 \text{ kHz}*N+\text{offset} \quad \text{[Equation 3]}$$

As described above, a frequency location of the nominal sync raster close to a maximum PRB boundary may be 900 kHz that is a common multiple between 100 kHz and 180 kHz. That is, a value of t may be 5 and a value of N may be 9. For simple description, if a gap subcarrier is absent, that is, if Gap=0, a PRB boundary may be 907.5 kHz by including 7.5 kHz corresponding to SCS/2 based on the DC carrier into the calculation. In this case, the nominal sync raster (=channel raster*N) may be 900 kHz. For alignment with the PRB boundary, the base station may provide the terminal with a PRB index value associated with an offset value for 7.5 kHz. The terminal may verify a location on a frequency axis at which a corresponding SS block is located and may use the verified location to perform data transmission and reception in the future.

Embodiment 2

The present embodiment relates to a method of determining and signaling a sync raster or an SS block frequency location if a channel raster based on an SCS or an RB size in the frequency band of 6 GHz or more is applied.

In embodiment 1, a frequency location of an actual sync raster is limited based on a nominal sync raster corresponding to a common multiple between the SCS or the RB size and the channel raster. In embodiment 2, such limitation may not be applied and thus, it is possible to further flexibly use frequency resources. That is, in embodiment 2, the actual sync raster may be defined based on an arbitrary nominal sync raster. In embodiment 2, since the channel raster is determined based on a predetermined SCS or RB size, RB alignment may be further readily performed compared to embodiment 1 in which the channel raster is fixed to 100 kHz.

FIG. 10 illustrates an example of indicating a frequency axial location of a sync raster when a SCS or RB size-based channel raster is applied according to the present disclosure.

In the example of FIG. 10, it is assumed that a channel raster is 180 kHz and a nominal sync raster is an integer multiple of the channel raster. Also, a PRB unit may start at a frequency location that is separate by SCS/2 from a channel center frequency based on a DC carrier.

Referring to FIG. 10, if a boundary of a sync BW that is a transmission bandwidth of an SS block is configured to match an RB boundary, a location of a center frequency of the sync BW may not match the nominal sync raster. Accordingly, a method of instructing a terminal to match the center frequency or of the sync BW or the sync raster to the RB boundary is required.

As a first example, a base station may inform the terminal of an offset value, that is, offset #1, from a channel center frequency (channel center to a center frequency (that is, a sync raster of a sync BW. Here, the offset may be indicated using various schemes, such as a distance (e.g., a unit of kHz) on a frequency axis, a number of subcarriers, and a number of PRBs.

Also, offset #1 may be defined as an offset value from the channel center frequency (channel center) to a PRB boundary of the sync BW. Here, the PRB boundary of the sync BW may correspond to a PRB boundary close to the channel center, for example, a PRB boundary toward a relatively low frequency in the example of FIG. 10, and may correspond to a PRB boundary away from the channel center, for example, a PRB boundary toward a relatively high frequency in the example of FIG. 10.

As a second example, the base station may inform the terminal of an offset value, that is, offset #2, from a frequency location of a nominal sync raster to a center frequency of a sync BW, that is, the sync raster. Here, the nominal sync raster that is a reference of offset #2 may correspond to a frequency location of a nominal sync raster closest to the sync BW. The offset may be indicated using various schemes, such as a distance (e.g., a unit of kHz) on a frequency axis, a number of subcarriers, and a number of PRBs.

Also, offset #2 may be defined as an offset value from the closest nominal sync raster to a PRB boundary of the sync BW. Here, the PRB boundary of the sync BW may correspond to a PRB boundary close to the channel center, for example, a PRB boundary toward a relatively low frequency in the example of FIG. 10, and may correspond to a PRB boundary away from the channel center, for example, a PRB boundary toward a relatively high frequency in the example of FIG. 10.

As a third example, the base station may inform the terminal of an offset value, that is, offset #3, from a CC center frequency or a BP center frequency to a center frequency of a sync BW, that is, the sync raster. Here, the offset may be indicated using various schemes, such as a distance (e.g., a unit of kHz) on a frequency axis, a number of subcarriers, and a number of PRBs.

Also, offset #3 may be defined as an offset value from the CC center frequency or the BP center frequency to a PRB boundary of the sync BW. Here, the PRB boundary of the sync BW may correspond to a PRB boundary close to the channel center, for example, a PRB boundary toward a relatively low frequency in the example of FIG. 10, and may correspond to a PRB boundary away from the channel center, for example, a PRB boundary toward a relatively high frequency in the example of FIG. 10.

As an example of information associated with the NR sync raster for the RB grid alignment, an offset, that is, offset #2 of FIG. 10, between the nominal sync raster and the sync raster, that is, the center frequency location of the SS BW, may be defined based on a relationship represented by Equation 4.

$$(SCS/2+Gap)+(RB\ size*k)*N=NR\ channel\ raster*N+ offset \quad [Equation\ 4]$$

Equation 4 represents a center frequency location of the NR sync raster toward a relatively high frequency, that is, + direction based on the channel center. In Equation 4, it may be assumed that "SCS/2" has a value of a kHz unit and "NR channel raster" has an integer multiple value of "RB size". For example, if the RB size is 180 kHz in the frequency band of 6 GHz or more, the NR channel raster may have a value of 180 kHz*k that is an integer multiple of the RB size. Also, NR channel raster*N may correspond to the nominal sync raster.

To easily perform the RB grid alignment, the channel raster corresponding to an integer multiple of 180 kHz corresponding to a single RB size based on an SCS of 15 kHz may be applied.

In the aforementioned various examples, signaling information associated with an offset value may be provided from the base station to the terminal in a form of system information (SI), for example, NR-PBCH, RMSI, and other system information (OSI). Also, signaling information associated with the offset value may be provided to the terminal through MAC signaling or RRC signaling.

FIG. 11 is a flowchart illustrating an SS block frequency location signaling method according to the present disclosure.

The method of FIG. 11 may be included in an initial cell access operation of a terminal.

Referring to FIG. 11, in operation S1110, a base station may transmit an NR-SS and an NB-PHCH to the terminal.

In operation S1120, the terminal may detect the NR-SS based on a nominal sync raster and may acquire system information through the NR-PBCH.

Here, during an initial cell access process, the terminal may not accurately be aware of an RB grid set by the base station and thus, may perform blind search or blind demodulation for the NR-SS based on the nominal sync raster. That is, the terminal may assume NR-SS frequency location candidates that are aligned with an RB grid based on a single nominal sync raster and may attempt NR-SS demodulation with respect to each frequency location candidate. Here, the frequency location candidates that are assumed for the NR-SS blind demodulation of the terminal may be limited to a preset number of candidates or range.

As described above, by performing the NR-SS blind demodulation with respect to each nominal sync raster, it is possible to detect an NR-SS based on an actual NR sync raster associated with a specific nominal sync raster and to perform NR-PBCH demodulation and acquire MIB information.

In operation S1125, the base station may provide offset information to the terminal.

For example, the offset information may be defined as an offset (e.g., offset #1) between a channel center frequency location and an actual sync raster frequency location, an offset (e.g., offset #2) between the nominal sync raster and the actual sync raster frequency location (a center PRB boundary of an SS block), or an offset (offset #3) between a CC or BP center frequency location and the actual sync raster frequency location.

Also, if the offset information is included in the system information provided through the NR-PBCH in operation S1110, operation S1125 may be omitted.

Alternatively, if the offset information is not provided through the NR-PBCH, the base station may provide the offset information to the terminal in a form of RMSI, OSI, and the like.

In operation S1130, the terminal may determine an actual frequency location of the RB boundary based on the offset information acquired from the base station. That is, although the terminal may not accurately be aware of an actual frequency location of the SS block that includes the NR-SS detected in operation S1120, the terminal may determine the actual frequency location of the SS block based on the additionally acquired offset information.

Accordingly, the terminal may acquire a center frequency, a numerology, and bandwidth information of a CC or a BP that includes the SS block, based on configuration information associated with the CC or the BP and the actual frequency location of the SS block determined in operation S1130. In addition, the terminal may determine an actual PRB index associated with the SS block and accordingly, may transmit and receive a reference signal, a data channel, a control channel, and signaling based on the determined actual PRB index.

FIG. 12 is a block diagram illustrating a configuration of a base station device and a terminal device according to the present disclosure.

Referring to FIG. 12, a base station device 1200 may include a processor 1210, an antenna device 1220, a transceiver 1230, and a memory 1240.

The processor 1210 may perform baseband-related signal processing and may include an upper layer processing 1211 and a physical (PHY) layer processing 1215. The upper layer processing 1211 may process an operation of a Medium Access Control (MAC) layer, a Radio Resource Control (RRC) layer, or more upper layer. The PHY layer processing 1215 may process an operation (e.g., uplink (UL) received signal processing and downlink (DL) transmission signal processing) of a PHY layer. The processor 1210 may control the overall operation of the base station device 1200 in addition to performing the baseband-related signal processing.

The antenna device 1220 may include at least one physical antenna. If the antenna device 1220 includes a plurality of antennas, multiple input multiple output (MIMO) transmission and reception may be supported. The transceiver 1230 may include a radio frequency (RF) transmitter and an RF receiver. The memory 1240 may store operated information of the processor 1210 and software, an operating system (OS), an application, etc., associated with an operation of the base station device 1200, and may include a component, for example, a buffer.

The processor 1210 of the base station device 1200 may be configured to implement an operation of a base station in the example embodiments disclosed herein.

The upper layer processing 1211 of the processor 1210 may include an offset information generator 1212. The offset information generator 1212 may generate offset information in a form of an offset (e.g., offset #1) between a channel center frequency location and an actual sync raster frequency location, an offset (e.g., offset #2) between a nominal sync raster and the actual sync raster frequency location, or an offset (e.g., offset #3) between a CC or BP center frequency location and the actual sync raster frequency location.

Such offset information may be provided to the terminal in a form of system information through an NR-PBCH or RMSI, OSI, etc., through a PDSCH.

The PHY layer processing 1215 of the processor 1210 may include an NR-SS mapper 1216 and an NR-PBCH mapper 1217.

The NR-SS mapper 1216 may map an NR-SS on time and frequency resources and may transmit the NR-SS to the terminal through the transceiver 1230.

The NR-PBCH mapper 1217 may map an NR-PBCH on the time and frequency resources and may transmit the NR-PBCH through the transceiver 1230.

Referring again to FIG. 12, a terminal device 1250 may include a processor 1260, an antenna device 1270, a transceiver 1280, and a memory 1290.

The processor 1260 may perform baseband-related signal processing and may include an upper layer processing 1261 and a PHY layer processing 1265. The upper layer processing 1261 may process an operation of a MAC layer, an RRC layer, or more upper layer. The PHY layer processing 1265 may process an operation (e.g., UL received signal processing and DL transmission signal processing) of a PHY layer. The processor 1260 may also control the overall operation of the terminal device 1250 in addition to performing baseband-related signal processing.

The antenna device 1270 may include at least one physical antenna. If the antenna device 1270 includes a plurality of antennas, MIMO transmission and reception may be supported. The transceiver 1280 may include an RF transmitter and an RF receiver. The memory 1290 may store operated information of the processor 1260 and software, an OS, an application, etc., associated with an operation of the terminal device 1250, and may include a component, for example, a buffer.

The processor 1260 of the terminal device 1250 may be configured to implement an operation of a terminal in the example embodiment disclosed herein.

The PHY layer processing 1265 of the processor 1260 may include an NR-SS-and-NR-PBCH detector 1266, an offset determiner 1267, and an SS block frequency location determiner 1268.

The NR-SS-and-NR-PBCH detector 1266 may detect an NR-SS based on the nominal sync raster and may acquire system information through the NR-PBCH. That is, the NR-SS-and-NR-PBCH detector 1266 may detect the NR-SS based on an actual NR sync raster associated with a specific nominal sync raster by performing NR-SS blind demodulation with respect to each nominal sync raster and accordingly, may perform NR-PBCH demodulation.

The offset determiner 1267 may determine an offset value from offset information that is provided from the base station in a form of MIB, RMSI, and OSI through the NR-PBCH, the PDSCH, and the like. Such offset information may be provided from the base station to the terminal in a form of an offset (e.g., offset #1) between a channel center frequency location and an actual sync raster frequency location, an offset (offset #2) between a nominal sync raster and the actual sync raster frequency location, or an offset (offset #3) between a CC or BP center frequency location and the actual sync raster frequency location.

The SS block frequency location determiner 1268 may determine an actual frequency location of an SS block based on the offset information acquired from the base station. That is, although the actual frequency location of the SS block that includes the NR-SS detected by the NR-SS-and-NR-PBCH detector 1266 is not accurately known, the SS block frequency location determiner 1268 may determine the actual frequency location of the SS block based on the additionally acquired offset information.

A user device (e.g., the terminal device 1250) may include a transceiver and a processor. The transceiver of the user device may receive a synchronization signal (SS) block comprising a synchronization signal and a physical broadcast channel (PBCH). The synchronization signal may include a PSS and an SSS described above. The processor of the user device may determine, from the PBCH, a value of a subcarrier offset between the SS block and an RB grid. The RB grid may include, or indicate, an RB boundary of one or more PRBs. The processor may determine, based on the value of the subcarrier offset and a frequency location of the SS block, the RB grid. The frequency location of the SS block may be the center frequency of the SS block, a boundary of the SS block, or other frequency locations associated with the SS block. For example, the frequency location of the SS block may comprise a nominal synchronization raster described above. The processor may decode, based on the determined RB grid, one or more of a reference signal, a control channel, or a data channel.

The processor of the user device may determine, based on the subcarrier offset, frequency information of a PRB. A frequency bandwidth of the SS block may correspond to total frequency bandwidths of a plurality of PRBs, and wherein a quantity of the plurality of PRBs is an even number. For example, the frequency bandwidth of the SS block may correspond to the total bandwidths of 24 PRBs. The processor may determine, based on the determined RB grid, a physical resource block (PRB) index, and determine, based on the PRB index, one or more resources associated with the one or more of the reference signal, the control channel, or the data channel.

The subcarrier offset may be represented by a quantity of subcarriers, and the value of the subcarrier offset may comprise a 4-bit value associated with the quantity of subcarriers. The subcarrier offset may indicate an offset between a frequency location of the SS block and a frequency location of a PRB. The processor may detect, based on a nominal synchronization raster, the synchronization signal and the PBCH, and retrieve, from decoding of the PBCH, master information block (MIB) information to obtain the value of the subcarrier offset.

A base station (e.g., the base station device 1200) may include a transceiver and a processor. The processor of the base station may generate an SS block comprising a synchronization signal and a PBCH, wherein the PBCH comprises a value of a subcarrier offset between the SS block and an RB grid. The transceiver of the base station may transmit, to a user device, the SS block. The processor may map, to one or more resources associated with the RB grid, one or more of a reference signal, a control channel, or a data channel, wherein a frequency location of the one or more resources is based on the value of the subcarrier offset and a frequency location of the SS block.

The processor of the base station may determine, based on the subcarrier offset, frequency information of a PRB. The processor may determine, based on the determined RB grid, a physical resource block (PRB) index. The one or more resources associated with the RB grid may be determined based on the PRB index.

In the exemplary system described above, processes are described as a series of steps or blocks based on a flowchart, aspects of the present invention are not limited to the illustrated order or sequence. Some steps may be processed in a different order or may be processed substantially simultaneously. Further, it will be understood that the illustrated steps in a flowchart do not necessarily exclude other steps, other steps may be included and one or more steps in a flowchart may be omitted without departing from the spirit and scope of the present invention.

The above description is to explain the technical aspects of exemplary embodiments of the present invention, and it will be apparent to those skills in the art that modifications and variations can be made without departing from the spirit and scope of the present invention. Thus, it is intended that the present invention cover the modifications and variations of this invention provided they come within the scope of the appended claims and their equivalents.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A wireless user device comprising:
    an antenna;
    a transceiver;
    a processor; and
    memory storing instructions that, when executed by the processor, cause the wireless user device to:
        select, among a plurality of synchronization signal (SS) blocks, a first SS block comprising a first synchronization signal and comprising a first physical broadcast channel (PBCH);
        determine, from the first PBCH of the selected first SS block, a value of a first subcarrier offset between the first SS block and a resource block (RB) grid;
        determine, based on the value of the first subcarrier offset and a frequency location of the first SS block, a frequency location of the RB grid; and
        decode, based on the determined frequency location of the RB grid, one or more of: a reference signal, a control channel, or a data channel,
    wherein the plurality of SS blocks comprise the first SS block and a second SS block,
    wherein the second SS block comprises a second synchronization signal and a second PBCH,
    wherein the second PBCH indicates a value of a second subcarrier offset between the second SS block and the RB grid, and
    wherein a distance between the first SS block and a center frequency of a carrier is different from a distance between the second SS block and the center frequency of the carrier.

2. The wireless user device of claim 1, wherein the instructions, when executed by the processor, cause the wireless user device to:
    determine, based on the first subcarrier offset, frequency information of a physical resource block (PRB).

3. The wireless user device of claim 1, wherein a frequency bandwidth of the first SS block corresponds to total frequency bandwidths of a plurality of physical resource blocks (PRBs), and wherein a quantity of the plurality of PRBs is an even number.

4. The wireless user device of claim 1, wherein the instructions, when executed by the processor, cause the wireless user device to:
    determine, based on the RB grid, a physical resource block (PRB) index; and
    determine, based on the PRB index, one or more resources associated with the one or more of the reference signal, the control channel, or the data channel.

5. The wireless user device of claim 1, wherein the first subcarrier offset is represented by a quantity of subcarriers, and
    wherein the value of the first subcarrier offset comprises a 4-bit value associated with the quantity of subcarriers.

6. The wireless user device of claim 1, wherein the first subcarrier offset indicates an offset between the frequency location of the first SS block and a frequency location of a physical resource block (PRB).

7. The wireless user device of claim 1, wherein the frequency location of the first SS block comprises a synchronization raster.

8. The wireless user device of claim 7, wherein the synchronization raster is a nominal synchronization raster.

9. The wireless user device of claim 1, wherein the instructions, when executed by the processor, cause the wireless user device to:
    detect, based on a synchronization raster, the first synchronization signal and the first PBCH; and
    retrieve, from decoding of the first PBCH, master information block (MIB) information to obtain the value of the first subcarrier offset.

10. The wireless user device of claim 1, wherein the RB grid is determined based on a subcarrier spacing.

11. The wireless user device of claim 1, wherein the instructions, when executed by the processor, cause the wireless user device to determine, based on a plurality of synchronization rasters in a frequency band, a frequency of the center of the first SS block.

12. The wireless user device of claim 1, wherein the plurality of SS blocks are associated with different frequencies.

13. A computing device comprising:
    an antenna;
    a transceiver;
    a processor; and
    memory storing instructions that, when executed by the processor, cause the computing device to:
        determine frequency locations of a plurality of synchronization signal (SS) blocks comprising a frequency location of a first SS block;
        determine, based on the frequency location of the first SS block and a frequency location of a resource block (RB) grid, a value of a first subcarrier offset between the first SS block and the RB grid;
        generate the first SS block comprising a first synchronization signal and comprising a first physical broadcast channel (PBCH), wherein the first PBCH comprises the value of the first subcarrier offset between the first SS block and the RB grid;

transmit, to a wireless user device, the first SS block; and map, to one or more resources associated with the frequency location of the RB grid, one or more of: a reference signal, a control channel, or a data channel, wherein a frequency location of the one or more resources is based on the frequency location of the RB grid, wherein the plurality of SS blocks comprise the first SS block and a second SS block, wherein the second SS block comprises a second synchronization signal and a second PBCH, wherein the second PBCH indicates a value of a second subcarrier offset between the second SS block and the RB grid, and wherein a distance between the first SS block and a center frequency of a carrier is different from a distance between the second SS block and the center frequency of the carrier.

14. The computing device of claim 13, wherein the instructions, when executed by the processor, cause the computing device to:

determine, based on the first subcarrier offset, frequency information of a physical resource block (PRB).

15. The computing device of claim 13, wherein a frequency bandwidth of the first SS block corresponds to total frequency bandwidths of a plurality of physical resource blocks (PRBs), and wherein a quantity of the plurality of PRBs is an even number.

16. The computing device of claim 13, wherein the instructions, when executed by the processor, cause the computing device to:

determine, based on the RB grid, a physical resource block (PRB) index, wherein, based on the PRB index, the one or more resources associated with the RB grid are determined.

17. The computing device of claim 13, wherein the first subcarrier offset is represented by a quantity of subcarriers, and wherein the value of the first subcarrier offset comprises a 4-bit value associated with the quantity of subcarriers.

18. The computing device of claim 13, wherein the first subcarrier offset indicates an offset between the frequency location of the first SS block and a frequency location of a physical resource block (PRB).

19. The computing device of claim 13, wherein the frequency location of the first SS block comprises a synchronization raster.

20. The computing device of claim 19, wherein the synchronization raster is a nominal synchronization raster.

21. The computing device of claim 13, wherein the RB grid is determined based on a subcarrier spacing.

22. The computing device of claim 13, wherein the plurality of SS blocks are associated with different frequencies.

* * * * *